(12) United States Patent  
Hanania

(10) Patent No.: US 8,035,520 B1  
(45) Date of Patent: Oct. 11, 2011

(54) DISCREET INTELLIGENCE SYSTEM

(76) Inventor: Jason M. Hanania, Tempe, AZ (US)

(*) Notice: Subject to any disclaimer, the term of this patent is extended or adjusted under 35 U.S.C. 154(b) by 0 days.

(21) Appl. No.: 12/802,416

(22) Filed: Jun. 7, 2010

Related U.S. Application Data

(63) Continuation of application No. 11/021,176, filed on Dec. 22, 2004, now Pat. No. 7,760,092.

(60) Provisional application No. 60/531,963, filed on Dec. 23, 2003.

(51) Int. Cl.  
*G08B 13/14* (2006.01)

(52) U.S. Cl. ............... 340/572.1; 340/10.1; 235/375

(58) Field of Classification Search .............. 340/572.1, 340/10.1; 235/375, 385  
See application file for complete search history.

(56) References Cited

U.S. PATENT DOCUMENTS

| | | | |
|---|---|---|---|
| 6,150,942 A * | 11/2000 | O'Brien | 340/573.1 |
| 6,198,394 B1 * | 3/2001 | Jacobsen et al. | 340/573.1 |
| 6,317,049 B1 * | 11/2001 | Toubia et al. | 340/573.4 |
| 6,493,649 B1 * | 12/2002 | Jones et al. | 702/150 |
| 7,012,520 B2 * | 3/2006 | Webb, Sr. | 340/539.13 |
| 2005/0080566 A1 * | 4/2005 | Vock et al. | 702/2 |
| 2006/0181421 A1 * | 8/2006 | Forcier et al. | 340/572.1 |
| 2008/0100445 A1 * | 5/2008 | Horwitz et al. | 340/572.1 |

* cited by examiner

*Primary Examiner* — Eric M Blount

(57) ABSTRACT

A pioneering information system providing improved acquisition, communication, and management of mobile element-related information, preferably through embedded manufacturing. Information modules, utilizing communications elements and information operations elements, are positioned proximate to the mobile element. The communications elements utilize discreet sensors and receivers, as well as discreet transmitters for transmitting the mobile element-related information. The information operations elements utilize discreet processors and data storage elements to process and manage the mobile element-related information. Carriers may be used to more effectively position the information modules proximate to the mobile elements.

8 Claims, 18 Drawing Sheets

NOT TO SCALE

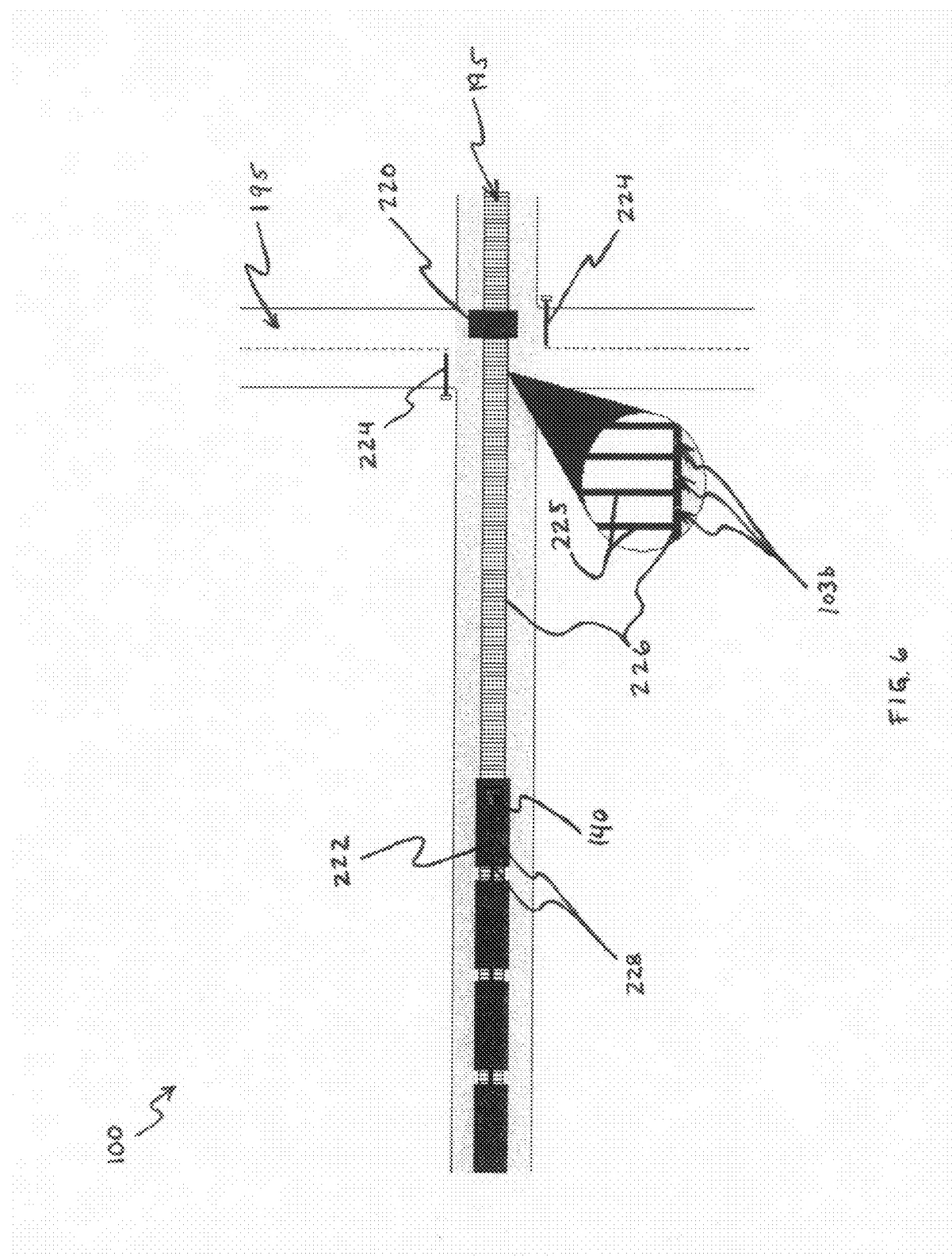

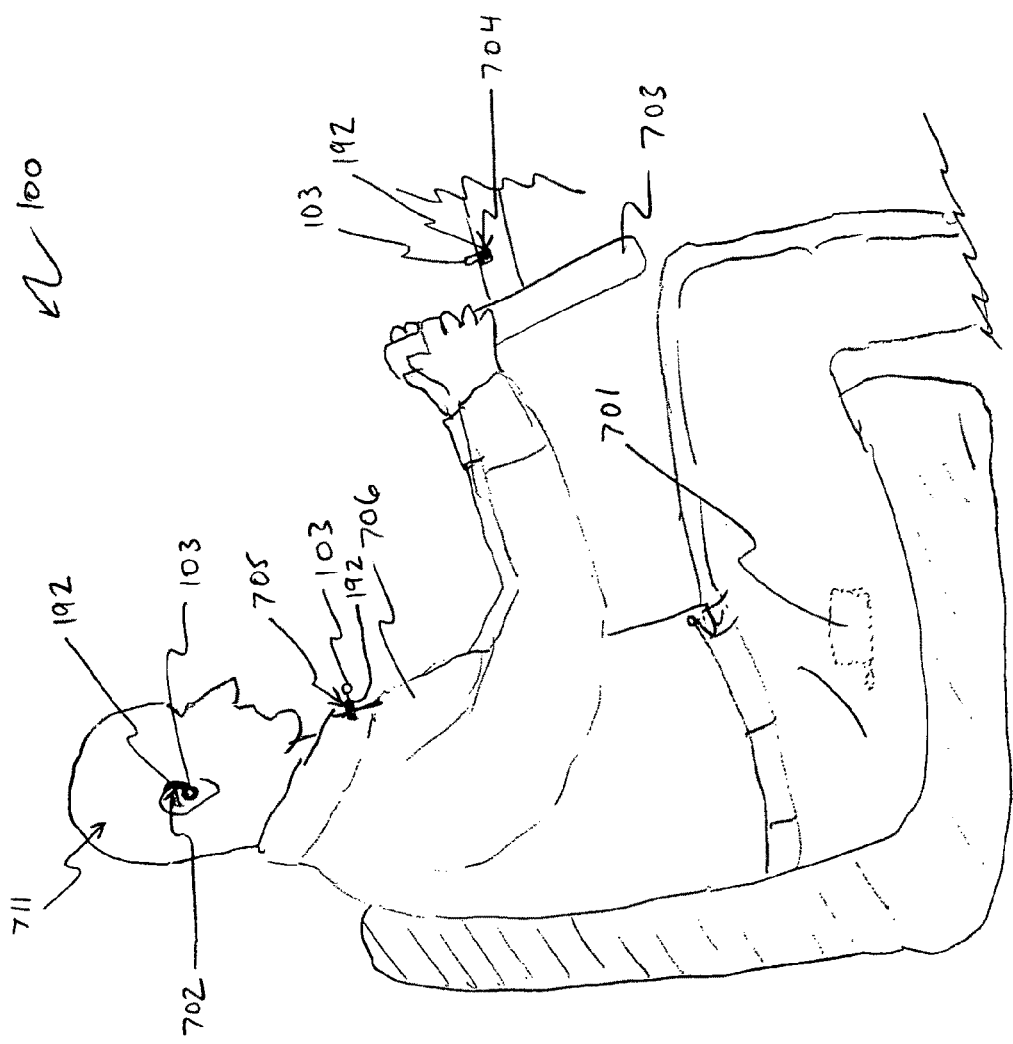

DISCREET INTELLIGENCE SYSTEM

ART UNIT 2612 RELATED APPLICATION

The present application is a continuation of my U.S. non-provisional utility patent application previously examined by Art Unit 2612, Examiner Eric Blount, Ser. No. 11/021,176, filed Dec. 22, 2004, now U.S. Pat. No. 7,760,092 entitled "DISCREET INFORMATION SYSTEM", which claims priority to my related U.S. provisional utility patent application Ser. No. 60/531,963, filed Dec. 23, 2003, entitled "DISCREET INFORMATION SYSTEMS".

FIELD OF INVENTION

This pioneering invention relates to discreet acquisition, communication, and management of information involving mobile elements.

BACKGROUND

Typically, antitheft devices are attached to merchandise to cause alarms to go off when the merchandise is stolen from a store without the antitheft device being removed. Such devices are inadequate because thieves can simply find the device on the item, remove the device from the merchandise, and then depart from the store. For example, leather jackets and other expensive items are often tagged with magnetic devices or devices that explode with ink when removed. Skilled thieves can find this security device and remove it using the same removal devices used by stores. The thief then walks out with the leather jacket, undetected. If the thief were unable to find the security device on the jacket, he could not remove it. Furthermore, if the security device was manufactured into the lining of the jacket, the thief would have to tear apart the jacket to find the device, destroying that which was sought by the thief. As a result, antitheft devices and methods, whereby transmitters are manufactured directly into discreet portions of items targeted by thieves, such that thieves cannot tell where the security device is on the item, are highly desirable. In addition, apparatus and software capable of visually tracking merchandise and other mobile items on a monitor, in real time, is highly desirable.

In addition, information involving mobile elements is typically acquired visually, such as by reading information, such as names and/or destinations, printed directly on a carrier of a mobile element, such as a postal container. Such systems are inadequate because millions of mobile elements are processed daily utilizing either (a) the vision of human laborers, (b) scanners (using a bar code), and/or (c) computers which can "read". For example, United States Postal Service (USPS) employees must properly orient mail parcels in order for a computer to "read" the destination information written on the envelope or package. This process is time, labor, and cost intensive, as well as occasionally unreliable, as poor handwriting sometimes results in misrouting of the package by a computer which is only capable of "reading" neat handwriting. Furthermore, when a postal container, such as an Express Mail envelope, is sent to the US Patent and Trademark Office (PTO), PTO employees must sort out the nature of the package, such as whether it contains a provisional or non-provisional application. Information contained in the cover sheet of such applications, such as applicant names and application types, must be visually read and processed by PTO employees. As a result, an automated and discreet processing system for high package-volume recipients, such as the USPS or PTO, which can upload and process information from each package, without visually reading or scanning the information, would be highly desirable. In addition, failure of the envelope to reach the PTO may result in the loss of an earlier filing date. Generally, the PTO can send a return receipt post card to the sender of a patent application, however, this receipt takes several days to receive. As a result, an instantaneous system informing a sender when his package is being opened, would also be highly desirable.

A primary object and feature of this pioneering invention is to provide improved acquisition, communication, and management of mobile element-related information, where current systems are occasionally unreliable, as well as time, labor, and cost intensive. Another object of the present invention is to provide an unnoticeable antitheft mechanism. A further object of the present invention is to provide modules for improved acquisition, communication, and management of mobile element-related information, utilizing discreet transmitters, receivers, sensors, processors, and/or data storage elements. Other objects and features of this invention will become apparent with reference to the following descriptions.

SUMMARY OF THE INVENTION

A pioneering information system providing improved acquisition, communication, and management of mobile element-related information, preferably through embedded manufacturing. Information modules, utilizing communications elements and information operations elements, are positioned proximate to a mobile element, such as a patent application. For example, a carrier, such as a cardboard USPS express mail envelope, with an information module manufactured into the envelope, may be used to more effectively position the information module proximate to the patent application. The sender then programs the information module by transmitting the destination information from a sender station to the information module located on the postal container. The communications element utilizes discreet sensors, receivers, and transmitters for receiving information from the sender's labeling station. For example, the communications element is capable of transmitting information to a USPS station and a PTO station, sensing when a postal container has been opened, transmitting when a postal container has been opened, and/or performing other related functions. The information operations element utilizes discreet processors and data storage elements to process and manage the information, such as the destination information specific to a postal container.

What is claimed is a discreet information system, used to provide mobile element-related information involving at least one mobile element, comprising, in combination: a plurality of information modules located proximate to the at least one mobile element, wherein the plurality of information modules comprise at least one communications element, and wherein the at least one communications element comprises at least one transmitter and wherein at least one of said plurality of information modules is embedded in at least one carrier. Also, a system wherein the plurality of information modules comprise at least one sensor. Also, a system wherein the plurality of information modules comprise at least one receiver. Also, a system wherein the plurality of information modules comprise at least one information operations element. Also, a system wherein the plurality of information modules comprise at least one processor. Also, a system wherein the plurality of information modules comprise at least one data storage element. Also, a system wherein at least one of the at least one transmitters transmits at a frequency greater than 1.6 gigahertz. Also, a system wherein the at least one mobile item is shipped through postal systems.

In addition, what is claimed is a system wherein the at least one carrier comprises at least one weapon. Also, a system wherein the at least one carrier comprises at least one document. Also, a system wherein the at least one carrier comprises at least one attacher. Also, a system wherein the at least one carrier comprises at least one container. Also, a system wherein the at least one carrier comprises at least one transporter. Also, a system wherein the at least one carrier comprises at least one barrier. Also, a system wherein the at least one carrier comprises at least one sellable.

In addition, what is claimed is a system further comprising at least one station, wherein the at least one weapon is a firearm, the firearm comprises at least one remediator, the at least one communications element comprises at least one receiver, the at least one station comprises at least one key, the at least one key comprises at least one second information module, the at least one second information module comprises at least one second communications element, and the at least one second communications element comprises at least one second transmitter which transmits to the firearm and activates the at least one remediator when the at least one key is outside of a particular radius of the firearm.

In addition, what is claimed is a system wherein the at least one attacher attaches at least one of the plurality of information modules to at least one soldier, and the information module attached to at least one soldier comprises at least one input structured and arranged to input at least one order on a battlefield without speaking.

In addition, what is claimed is a system further comprising at least one station, wherein said at least one station comprises at least one pharmacy, at least one of the plurality of information modules comprises at least one medical establishment, at least one of the plurality of information modules comprises at least one input structured and arranged to input prescriptions, and the prescriptions are transmitted from the at least one medical establishment to the at least one station.

In addition, what is claimed is a system wherein at least one of the plurality of information modules comprise at least one station, the at least one station comprises at least one information operations element, the at least one information operations element comprises at least one data processor, and the at least one communications element comprises at least one receiver. Also, a system wherein the at least one station comprises at least one input. Also, a system wherein the at least one station comprises at least one output. Also, a system wherein at least one of the plurality of information modules comprises at least one housing, and the at least one housing comprises at least one liquid. In addition, what is claimed is a system wherein at least one of the plurality of information modules comprise at least one remediator.

BRIEF DESCRIPTION OF THE DRAWINGS

FIG. 6 is a birds-eye view of a railroad system according to the present invention.
FIG. 18 is a perspective view of an attacher according to the present invention.

DETAILED DESCRIPTION OF THE INVENTION

Figure 1:
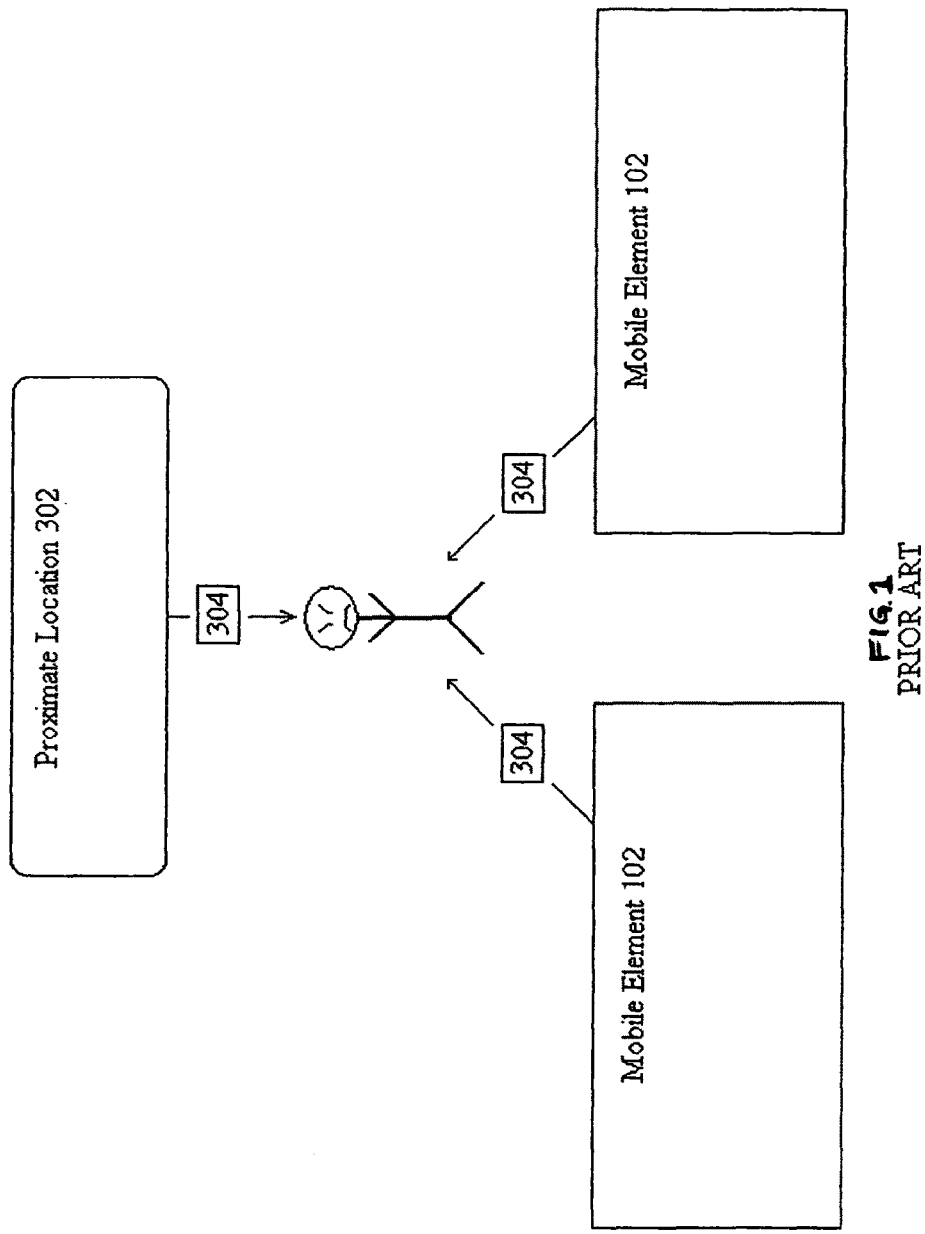
FIG. 1 is a diagram of a prior art mobile element-related information acquisition system.
Figure 2:
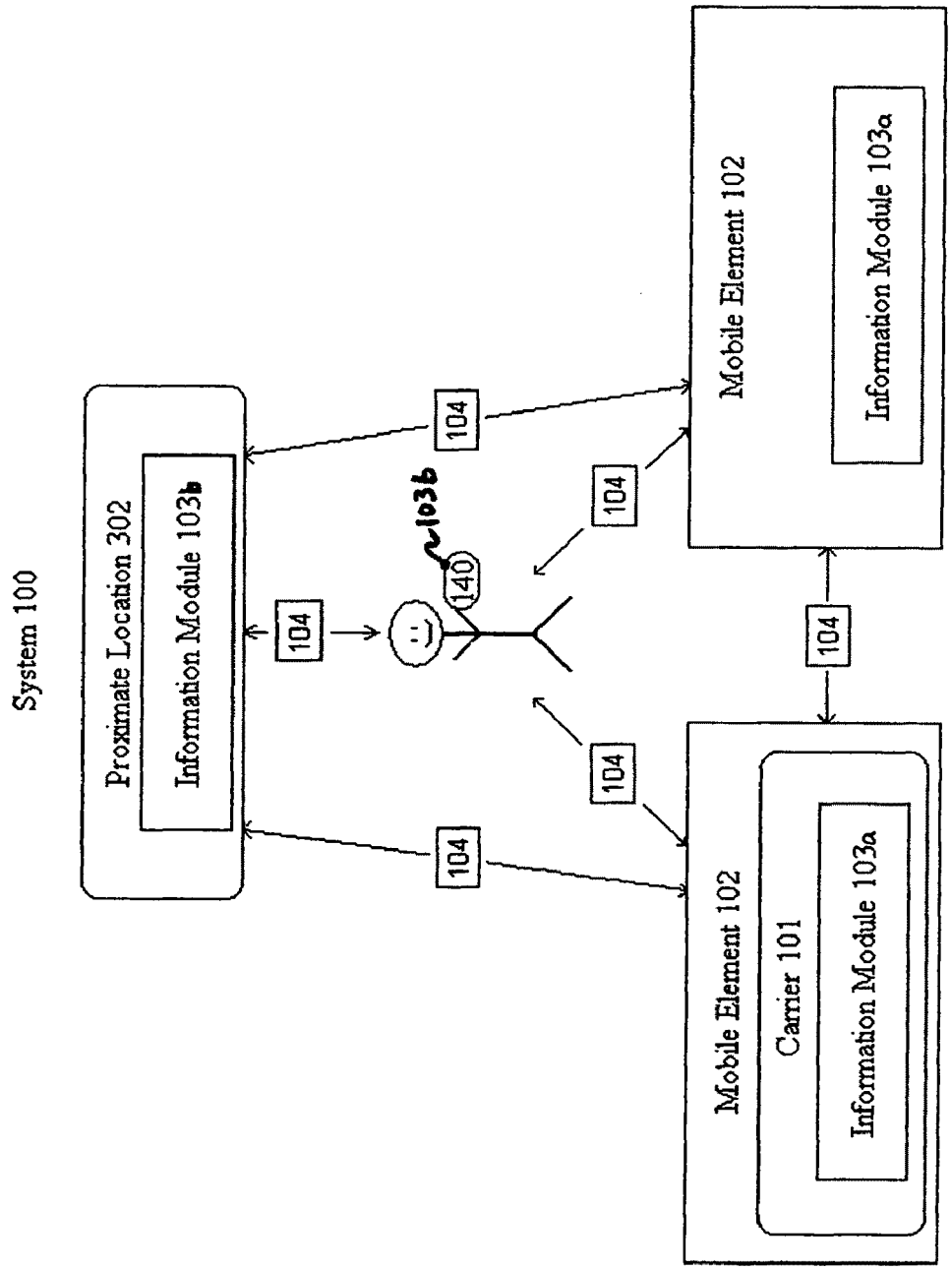
FIG. 2 is a diagram of system 100 according to one embodiment of the present invention.

Referring to FIGS. 1-21, system 100 comprises information modules 103, utilized to provide improved acquisition, communication, and management of mobile element-related information 104 involving a mobile element 102, where information 304 acquired using prior art methods is time, labor, and cost intensive, as well as occasionally inconvenient or unreliable, as discussed in the Background Section and shown in FIG. 1. "Primary" information modules 103, shown in the FIGS. as information modules 103a, are generally located proximate to a mobile element 102. "Secondary" information modules 103, shown in the FIGS. as information modules 103b, are generally located at any other location providing for improved acquisition of mobile element-related information 104, such as stations 140 and proximate locations 302, as shown in FIG. 2. Mobile elements 102 comprise any elements that are physically mobile, such as US patent application papers. Under appropriate circumstances, considering issues such as laws, management, technology, cost, culture, etc., other mobile elements 102, such as letters, other papers, packages, bags, luggage, digital media, personal items, products, merchandise, sellables, cargo, payloads, assets, towels, pillows, other hotel items, balls, other sports apparatus, sensors, guns, bullets, other deadly projectiles, other weapons, currency, keys, elements contained in luggage, elements shipped through postal systems such as USPS, Federal Express (FedEx), and United Parcel Service (UPS), athletes, searchers, other people, air, water, other fluids, light, other elements shipped by trains, other elements shipped by 18-wheelers, other elements shipped by planes, other elements shipped by boats, elements shipped by other shipping vehicles, other commercial elements, other items and elements mobilized in bulk, etc., may suffice.

Mobile element-related information 104 comprises any information related to mobile elements 102, such as the address of the PTO and other destination information regarding a patent application. Under appropriate circumstances, considering issues such as technology, cost, management, etc., other mobile element-related information 104, such as originating locations, intermediate stopping locations, previous destinations, previously occupied locations, current position (such as for antitheft detection), distances, names, addresses, zip codes, phone numbers, email addresses, flight information, hazards, quantities, physical properties, geometries, dimensions, material types, conditions, monetary amounts, nationality, ethnicity, heights, weights, other attributes, colors, mechanical properties, fluid properties, inertial properties, changes in conditions, other personal information, other sensed information, other technical information, other geographical information, etc., may suffice.

Figure 8:
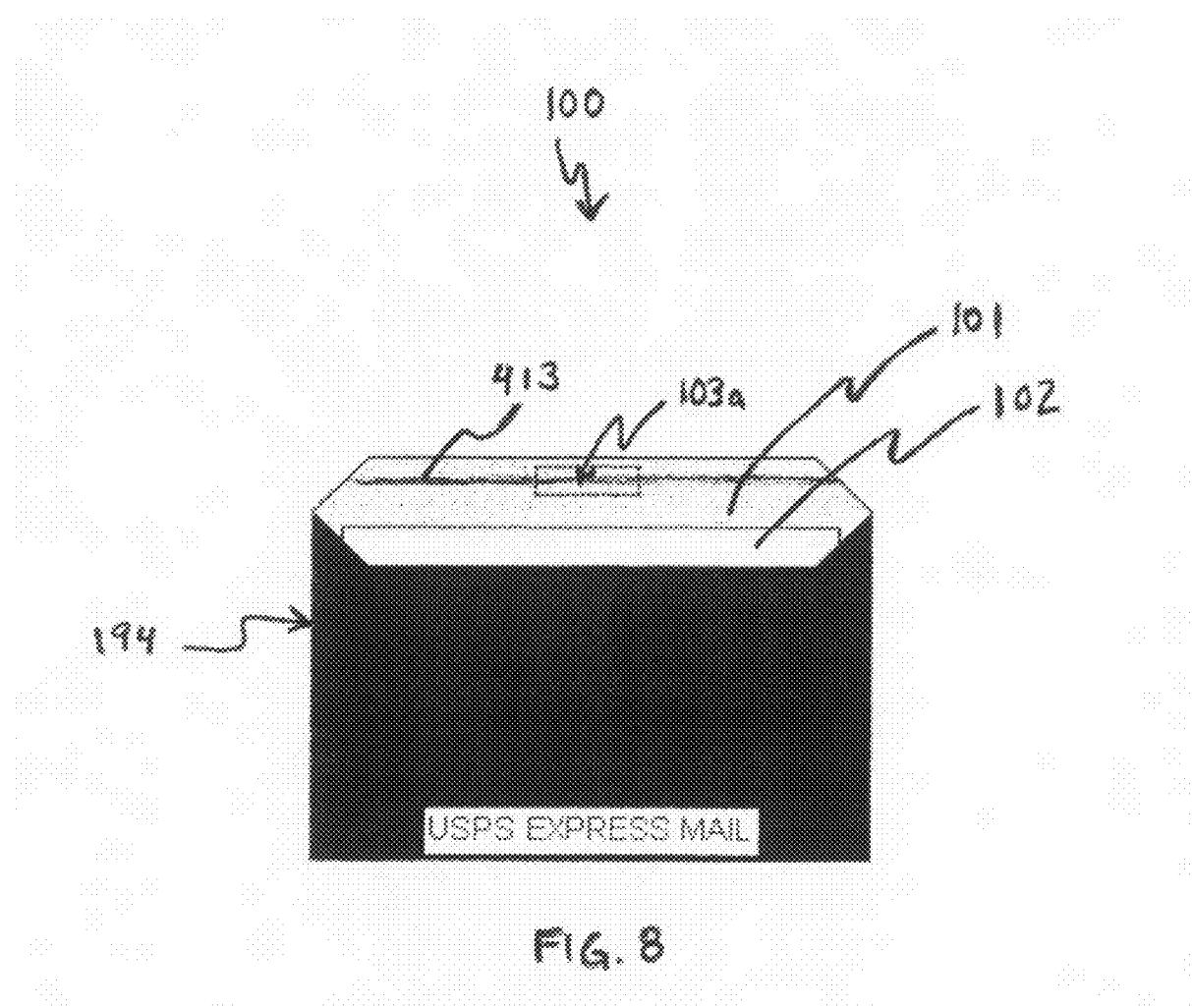
FIG. 8 is a perspective view of an express mail envelope according to the best mode of the present invention.
Figure 11:
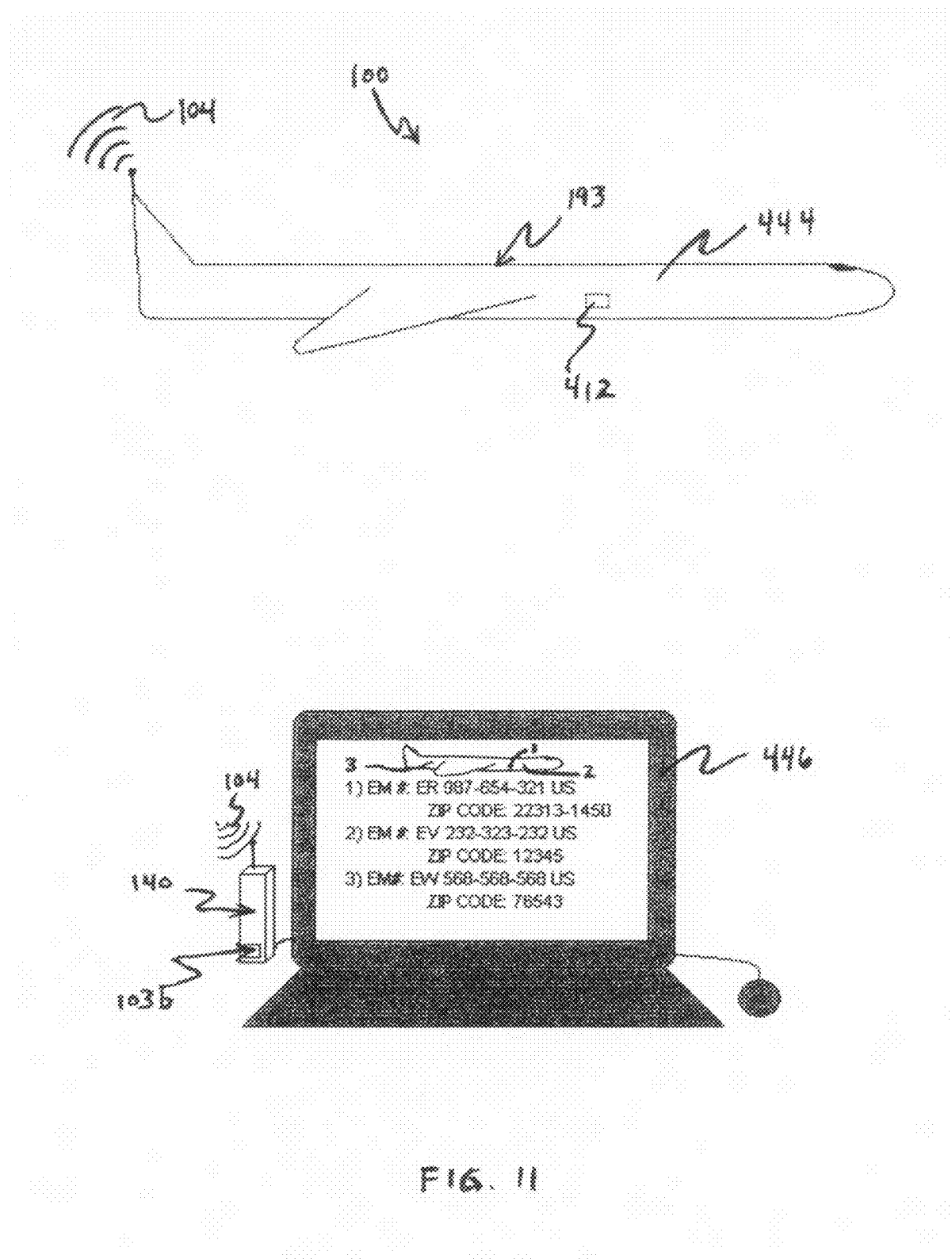
FIG. 11 is a third station according to the best mode of the present invention and a fourth station demonstrating mobile item position tracking software according to the best mode of the present invention.
Figure 20:
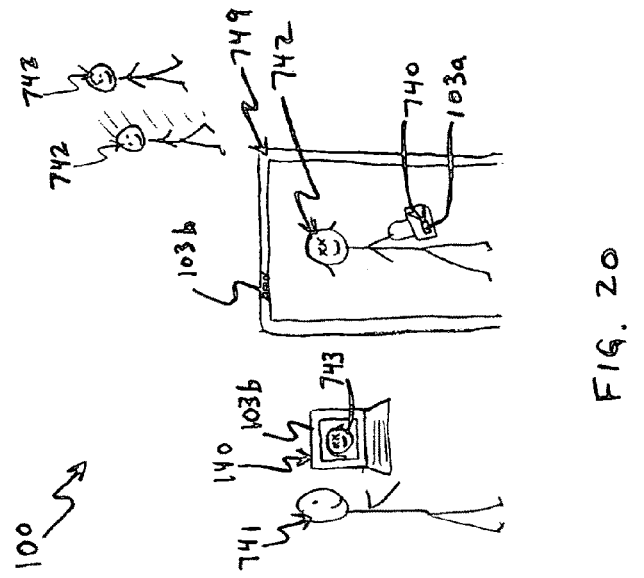
FIG. 20 is a perspective view of documents according to the present invention.

Carriers 101 comprise any element, such as an express mail envelope, which allows at least one primary information module 103*a* to remain proximate to at least one mobile element 102, such as a patent application. Carrier 101 may comprise the mobile element 102 in question. Under appropriate circumstances, considering issues such as cost, technology, market demand, culture, etc., other carriers 101, such as: bullets, guns, missiles, firearms, knives, other sharp objects, grenades, other explosives, flame throwers, other weapons 190, as shown in FIG. 21; passports, identifications, books, credentials, references, papers, other documents 191, as shown in FIG. 20; stickers, tags, stamps, labels, straps, collars, fasteners, buckles, hooks, grips, snaps, Velcro™, magnets, clips, paper clips, other attachers 192, as shown in FIG. 18; automobiles, trains, 18-wheelers, planes, helicopters, wagons, carts, other vehicles, boats, other floaters, bikes, tools, vessels, motorcycles, hair, teeth, other portions of a person, balloons, other transporters 193, as shown in FIG. 11; other envelopes, boxes, bags, briefcases, luggage, suitcases, crates, pallets, trays, holders, vents, receptacles, canisters, receptacles, bottles, housings, other containers 194, as shown in FIG. 8; capsules, housings, libraries, dealerships, warehouses, stores, other storage facilities, other protective configurations, flooring, walls, fences, portions of a window, tile, carpet, concrete, brick, rubber, drywall, wood, brick, other flooring materials, other potentially solid and flat materials, pathways, railroad tracks, airplane runways, freeways, other barriers 195, as shown in FIG. 6; groceries, products, assets, property, goods, merchandise, apparel, other sellables 196; etc., may suffice.

Figure 21:
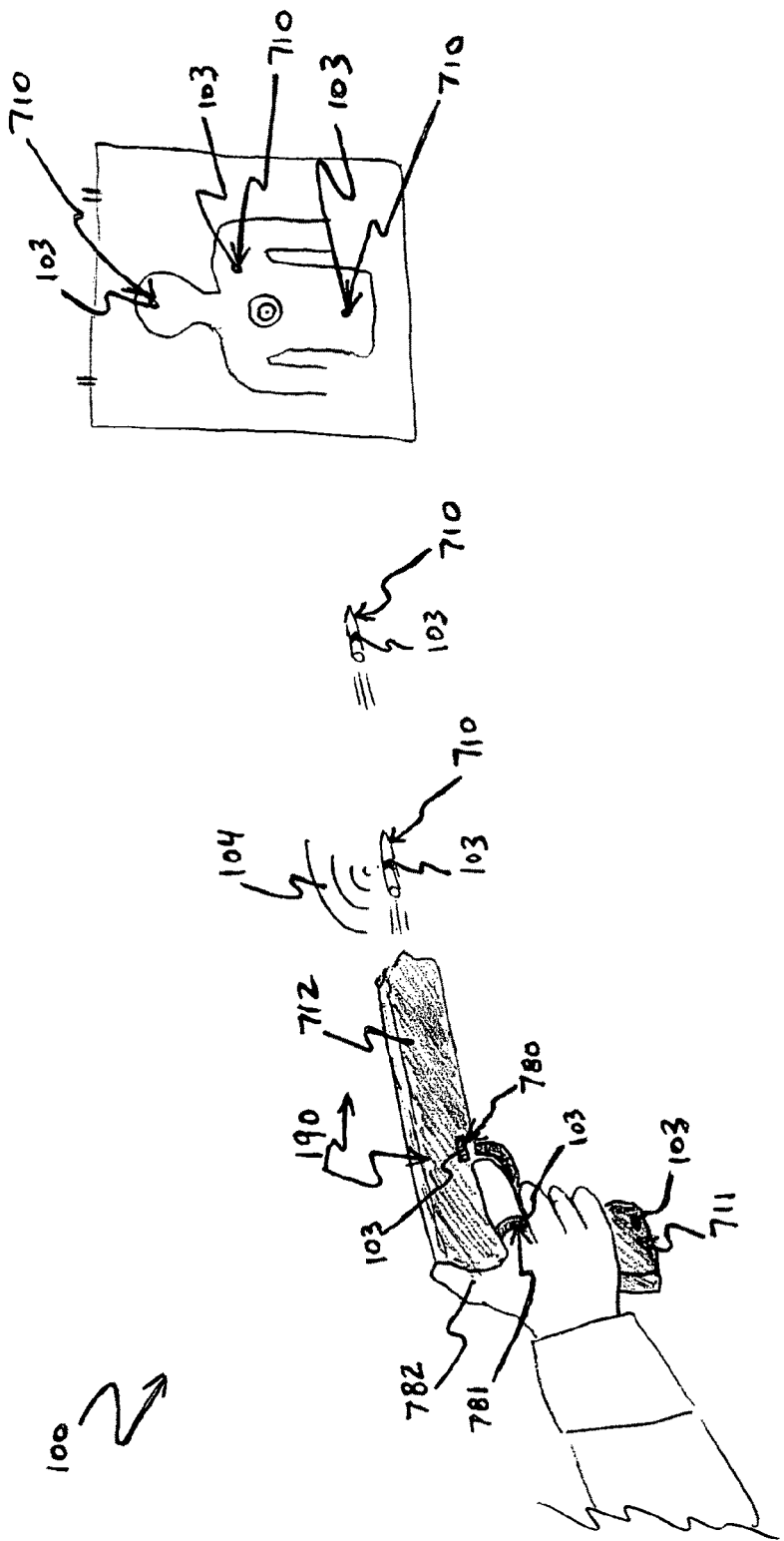
FIG. 21 is a perspective view of weapons according to the present invention.

For example, a primary information module 103*a* could comprise a weapon 190 such as a bullet or missile, embedded in the shell, as shown in FIG. 21. In another example, a primary information module 103*a* could comprise a document 191 such as an international passport, wherein the information module 103 is embedded in one of the pages. In yet another example, a primary information module 103*a* could comprise documents 191 such as a book, embedded in the cover. In another example, a primary information module 103*a* could comprise an attacher 192 such as a sticker or label, which comprises a print layer and an adhesive layer which can thus be attached to a mobile element 102, such as an envelope, much like a modern one inch square postage stamp attaches to an envelope. In another example, a primary information module 103*a* could comprise an attacher 192 such as a strap, which can then be attached to a handle on a mobile element 102 such as a suitcase (replacing the little paper tags handed out by airlines for writing your address on and attaching to the suitcase handle). In yet another example, a primary information module 103*a* could comprise an attacher 192 such as a magnet such that it can be thrown onto a mobile element 102 wherein the magnet will stick to the mobile element 102. In another example, a primary information module 103*a* could comprise an attacher 192 such as an animal collar or children's clothing, such that, for example, the collar transmits to a secondary information module 103*b*, and an open door is closed so as to prevent a dog from otherwise running away or preventing an infant from accessing a pool area. In yet another example, a primary information module 103*a* could comprise a transporter 193 such as a train, such as the sliding side door of a train. In another example, a primary information module 103*a* could comprise a transporter 193 such as an airplane, such as a window, landing gear, or portion of the airplane's hull. In yet another example, a primary information module 103*a* could comprise a transporter 193 such as a ship, such as the hull, motor, or rudders of the ship. In another example, a primary information module 103*a* could comprise a container 194 such as a cargo crate, such as embedding it within the wall of the cargo crate. In yet another example, a primary information module 103*a* could comprise a container 194 such as a cardboard box, such as the lid or a flap on the cardboard box. In another example, a primary information module 103*a* could comprise a container 194 such as a canister, such as the lid (a plastic lid could be manufactured with a primary information module 103*a* sealed inside). In yet another example, a primary information module 103*a* could comprise a container 194 such as a suitcase, such that the owner of the suitcase could transmit (from a station 140, discussed below) their name, address, phone number, and other information to the suitcase, before they even use the suitcase on a flight, eliminating the need for the little paper tags handed out by airlines for attaching to your suitcase handle. In another example, a primary information module 103*a* could comprise portions of both a container 194 and barrier 195 such as a house, such as flooring, roofing, tile, vents, appliances, carpet, lights, countertops, concrete, shelves, cabinets, etc. In yet another example, a primary information module 103*a* could comprise a container 194 and merchandise 196 such as the plastic jewel casing of a musical compact disc, and/or the actual disc itself, so as to prevent theft. In another example, a primary information module 103*a* could comprise a container 194 such as a bottle, embedded in the glass, plastic, or any other material comprising the bottle. In yet another example, a primary information module 103*a* could comprise portions of a barrier such as a window, such as the glass, plastic, curtains, or blinds. In another example, as shown in FIG. 6, a primary information module 103*a* could comprise a barrier 195, such as flooring, drywall, wood, pathways, brick, concrete, the interior portion of a pool, etc. In yet another example, a primary information module 103*a* could comprise merchandise 196 such as hoses, tanks, helmets, suits, tools, etc.

Figure 3:
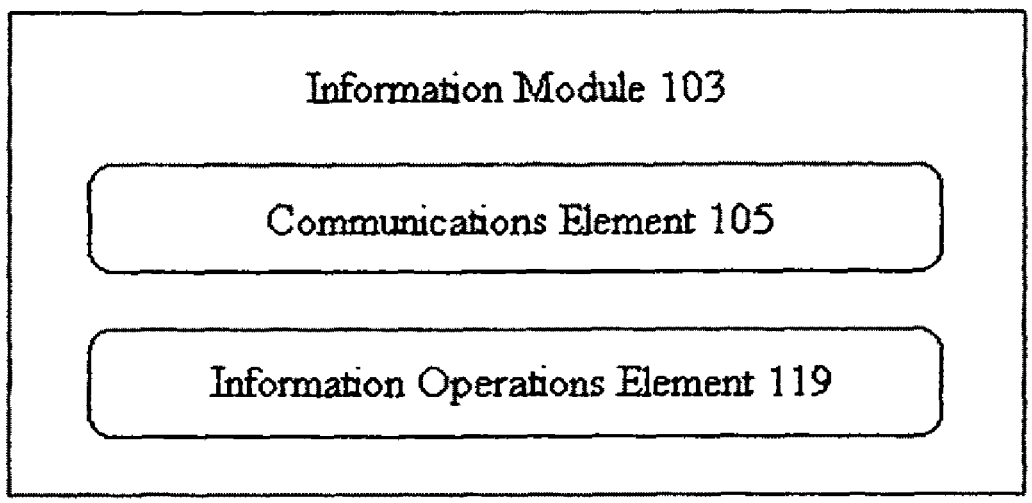
FIG. 3 is a diagram of an information module.
Figure 19:
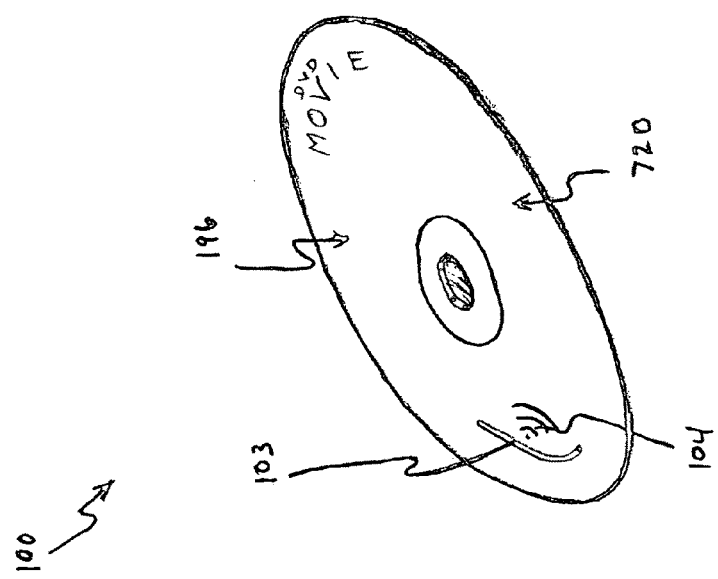
FIG. 19 is a perspective view of sellables according to the present invention.

Information module 103 is preferably discreet and inconspicuous. As shown in FIG. 3, information module 103 may comprise a communications elements 105 and/or an information operations elements 119. Information module 103 may also comprise its own energy source 114. Information module 103 is preferably less than 1000 cubic millimeters in volume, and manufactured or discreetly embedded into a carrier 101 or directly into a mobile element 102, so as not to be visible, as shown in FIG. 19. In the case of purchased items, such as DVD's, a thief who would otherwise tear off a security device, will be unable to determine where exactly the information module 103 is located on the item. The position of information modules 103 could be changed periodically, such as by the item's manufacturer, so as to reduce the chances of people learning (such as thieves conspiring with employees) where the information module 103 is on a particular item (potentially allowing them to remove it). Information module

103 may also comprise a housing 170 and/or a remediator 160. Information module 103 may also comprise means for absorbing energy and/or preventing damage to information module 103, such as springs, compressors, tensioners, insulators, coolers, heaters, seals, cushions, fluids, and/or dampeners.

Figure 4:
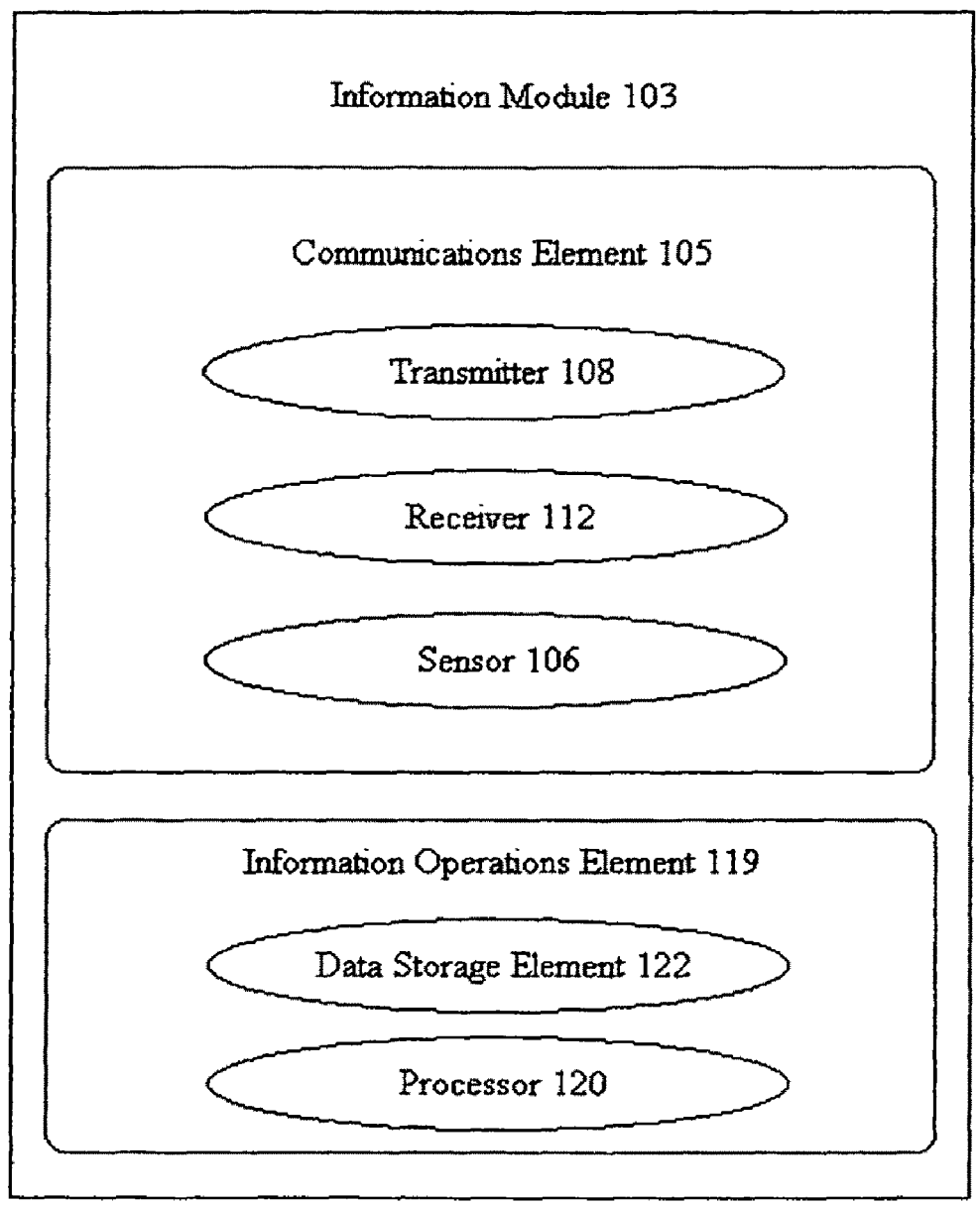
FIG. 4 is another diagram of an information module.

As shown in FIG. 4, communications element 105 may comprise a transmitter 108, a sensor 106, a receiver 112, and/or any other apparatus that collects and/or distributes mobile element-related information 104. "Primary" communications elements 105 represent all communications elements 105 comprising "primary" information modules 103*a*. "Secondary" communications elements 105 represent all communications elements 105 comprising "secondary" information modules 103*b*.

As shown in FIG. 4, information operations element 119 may comprise a processor 120, a data storage element 122, and/or any other apparatus that processes, stores, modifies, and/or organizes mobile element-related information 104. "Primary" information operations elements 119 represent all information operations elements 119 comprising "primary" information modules 103*a*. "Secondary" information operations elements 119 represent all information operations elements 119 comprising "secondary" information modules 103*b*.

Transmitter 108 is preferably discreetly micro-size or smaller where it comprises a primary information module 103*a*. Transmitter 108 preferably adds negligible weight to a mobile element 102 and/or a carrier 101, where transmitter 108 comprises a primary information module 103*a*. Transmitters 108 are used to transmit information 104 between information modules 103, preferably transmitting at a frequency greater than 1.6 gigahertz so as to provide increased data transfer rates and increased transmission ranges. Under appropriate circumstances, considering issues such as cost, technology, market demand, etc., other transmissions, such as electrical, radio, microwave, infrared, visible, ultraviolet, x-ray, gamma, frequencies equal to or less than 1.6 gigahertz, etc., may suffice. Reference transmitters may also be utilized, comprising global positioning system (GPS), stationary transmitters, and/or any other system used to provide some sort of reference position. When the signals from reference transmitters are combined with the transmitted signal from a transmitter 108, the position of the transmitter 108, and the approximate position of the mobile element 102, can be determined.

Receiver 112 is preferably discreetly micro-size or smaller where it comprises an information module 103*a*. Receiver 112 may be any size, where it comprises a secondary information module 103*b*. Receivers 112 and transmitters 108, together in any portion of system 100, may comprise transceivers.

Sensor 106 is preferably discreetly micro-size or smaller. Sensor 106 may be a camera, a microphone, and/or a microcircuit which transmits when the circuit is broken, such as when an express mail envelope is opened (the tear-away opening strip 413, as shown in FIG. 8, on the envelope, can cause a circuit to break and a transmission to occur). Under appropriate circumstances, considering issues such as cost, technology, safety, market demands, etc., other sensors 106, such as sensors capable of detecting velocities and changes in velocity, directions and changes in direction, forces and changes in forces, geometry and changes in geometry, materials and changes in material, energy and changes in energy, fire, smoke, hazardous materials, any other information indicating at least one undesirable condition, magnetic fields and changes in magnetic fields, sound and changes in sound, light and changes in light, other vibrations and frequencies such as electric, radio, television, microwave, infrared, visible, ultraviolet, x-ray, and/or gamma, as well as changes in frequency, detonation, temperatures and changes in temperature, health conditions, such as heart rates, blood pressure, emotions, fluids and fluid properties, pressures and changes in pressure, volumes and changes in volume, biohazards, precipitation, mass and inertial changes, obstructions, etc., may suffice.

To provide an example, sensor 106 can be used on a cargo crate to detect when the crate is being opened. If the position of a cargo crate is transmitted as being only half way to its destination, and a transmission is received indicating that the cargo crate has been opened, action could be taken to prevent a possible theft. In another example, sensor 106 can be used on tanker trunks, canisters, and/or other containers, to detect changes in temperature. In yet another example, sensor 106 can be used on baggage to detect fire on an airplane. In another example, sensor 106 can be used on postal containers to detect the presence of hazardous materials. In yet another example, sensor 106 can be used on a searching scuba diver, such as wetsuits, air tank, and/or any other portion of a diver. Air tank sensors 106 could be utilized to detect (which can be transmitted to a station 140 user outside of the water) how much air is left in the tank (such a station 140 user can manage the safety and efficiency of all of the divers). Positional information can also be correlated utilizing a processor 120 to determine which areas underwater have already been searched by the divers. In another example, sensor 106 can be used on a searcher moving through earthquake debris, such as a microphone, whereby sound, vibrations, and positional information can be correlated by a processor 120 to determine the location of people or animals buried in the debris. In yet another example, sensor 106 can be used on a firefighter's suit or air tank, such as microphones (for detecting noise from people and animals still alive inside a fire-danger zone) and air tank sensors 106 detect (which can be transmitted to a station 140 user outside of the fire-danger zone) how much air is left in the tank, as well as health-related sensors 106 which detect the heart rate of the firefighter and other health related information (such a user can manage the safety and efficiency of all of the firefighters). In another example, sensor 106 can be used on bullets 710, clips 711, guns 712, or other deadly projectiles and weapons, as shown in FIG. 21, such that a sound detector (or some other means for detecting people, targets, etc.) comprises the bullet and can detect voices, breathing, or a heart pulse, if someone is still alive in a targeted location. In yet another example, sensor 106 can be used, as shown in FIG. 6, on carriers 101, such as rails 226, tracks 225, wigwams 224, and/or other portions of pathways (which are barriers 195 between the ground and transporters such as a train 222) at proximate locations 302, so as to detect the presence of objects, such as cars 220, people, trees, power lines, etc., impeding the path of a train 222, which would collide with the train 222 (such information could then be transmitted to a station 140 ahead of time so that a remedy could be implemented, such as removal of the impediment). A remediator 160, such as an autonomous braking device 228 could be attached to the train that causes a braking signal or causes the train to autonomously brake. In another example, sensor 106 can be used in or on the wall of a pool, such that the presence of chlorine, other chemicals, bacteria, viruses, or other pool transients, could be detected (useful for keeping the pool safe to swim in). A remediator 160, such as a device that autonomously adds more chemicals (chlorine, etc.), could be implemented so that people do not have to manage the pool. The pool walls could also have sensors 106 that detect the body of a swimmer (useful in races for determining who touched the wall first) and/or other elements associated with pools. In yet another example, sensor 106 can be used on flooring, to detect the presence of spills, water, grease, and/or other slippery elements, so that slips and falls can be prevented (the detected information 104 would then be transmitted to a station 140, resulting in (a) a sign is turned on which outputs "caution: floor is slippery", (b) a person being told to go dry the floor, and/or (c) some other remedy). In another example, sensor 106 can be used on any portion of a window, such as glass, plastic, curtains, or blinds, to detect precipitation or light, such that curtains, blinds, or other blockers can close automatically (the blocker could gradually and partially open or close as more or less light enters the window). In yet another example, sensor 106 can be used on oil pans, brakes, and/or other portions of a vehicle, in order to detect inner and/or outer leaking by precipitation, automotive fluids, and/or other fluids. In another example, sensor 106 can be used on hulls of aircraft and watercraft, so as to detect inner and/or outer leaking of water, precipitation, automotive fluids, and/or other fluids. In yet another example, sensor 106 can be used on, near, or proximate to the ends of air conditioning fans, vents, refrigerators, generators, etc., so as to provide temperatures specific to portions of an air-conditioned space, providing for greater energy efficiency (such information could be compiled and regulated by a processor 120, such as a processor 120 comprising a thermostat or some other condition regulation station 140). A remediator 160 could then regulate temperature, flow, etc., by closing the vent, adjusting thermostat settings, etc.

Processor 120 is preferably discreetly micro-size or smaller where it comprises a primary information module 103*a*. Processor 120 preferably comprises a hand held or personal computer, where it comprises an information module 103*b*. Processors 120 comprising primary information modules 103*a*, may be reconfigured or reprogrammed without taking primary information module 103*a* apart, if commands are transmitted to primary information module 103*a*, utilizing a receiver 112 comprising the transmittee information module 103.

Data storage element 122 comprises any memory device for storing information. Data storage element 122 is preferably discreetly micro-size or smaller memory where it comprises a primary information module 103*a*. Preferably, where data storage element 122 comprises a secondary information module 103*b*, data storage element 122 is a hard drive and/or any other standard industry memory element.

An energy source 114 that is powering any portion of system 100 would preferably be a discreetly micro-size or smaller power source. An energy source 114 which is powering any portion of a station 140 is preferably a traditional battery, such as a nickel-cadmium battery. An energy source 114 which is powering a personal computer or sorting station 140 may be an AC/DC plug in cord. Under appropriate circumstances, considering issues such as technology, cost, effectiveness, etc., other energy sources 114, such as crystals, solar, sub-atomic, kinetic, fluid, chemical, hydroelectric, photovoltaic, wind, biomass, geothermal, radiation, nuclear, fossil fuels, body heat, other sources of energy local to system 100, etc., may suffice.

In addition, several communications elements 105 could be placed broadly over the interior surface of a mobile element 102 or carrier 101, so as to provide a processor 120 with a positional image of all portions of, for example, a crate, so as to provide some indication of tampering with the crate on a portion of the crate not comprising the lid, such as if a thief was cutting a hole in the back of a crate. Furthermore, sensors 106 with high surface area, such as wires, could be manufactured into a substantial portion of a carrier 101 or mobile element 102, such as a window, container, etc., canvassing the entire carrier 101 or mobile element 102 with a web of sensing elements.

Figure 5A:
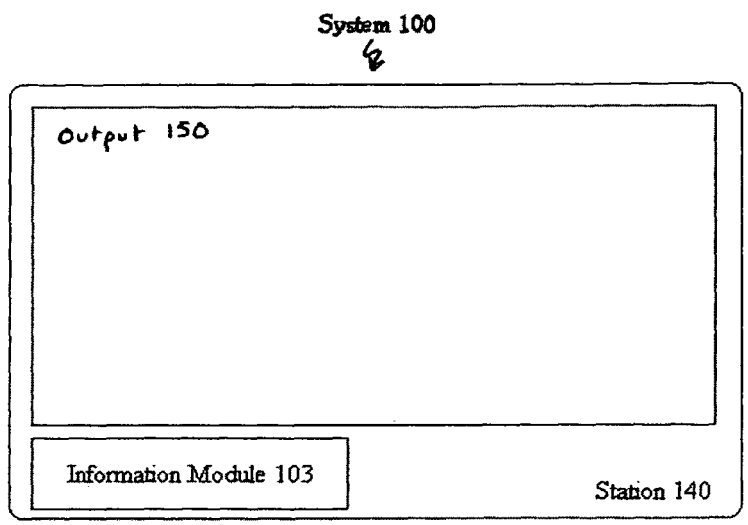
FIG. 5a is a diagram of a station.

Information modules 103 may also comprise an output 150, as shown in FIG. 5*a*, such as a display, digital screen, touchpad interactive screen, scoreboard, billboard, ticker, monitor, television, voice interactive medium, printer, other visual communications systems, etc. Information modules 103 may also comprise an input 151, such as a keyboard, voice recognition device, mouse, touchpad interactive screen, etc.

As shown in FIG. 5*a*, stations 140 comprise information modules 103, preferably secondary information modules 103*b*. For example, labeling systems, such as a home computer, where mobile element-related information 104 can be input into the home computer and transmitted to an information module 103. For instance, a labeling station 140 may be placed in every household, such that names, addresses, postage fees, and other information 104 does not need to be written on or attached to carriers 101 or mobile elements 102, such as envelopes, stickers, labels, boxes, etc. Such information 104 can be input into the labeling station 140 and transmitted to the information module 103 comprising the carrier 101 (such as the sticker, label, or box). Such information 104 would then be received and uploaded to a mobile element 102 recipient's database (such as the PTO's database), computer, network, etc., without the recipient ever having to type or input the information 104. In another example, sorting stations 140, preferably autonomous, could be installed at factories, stores, USPS, FedEx, UPS, the PTO, airports, etc., replacing people and providing automated sorting by zip code, street address, name, country, flight number, weights, monetary values, other mobile element-related information 104, etc. In yet another example, hand held device stations 140, such as personal digital assistants (PDA's), can provide an index of all mobile elements 102 (and attributes such as destination or weight) under the management of the hand held device user. In another example, tracking-party systems, such as an armored car service, which can track the path of a valuable mobile element 102, and react where such a mobile element 102 deviates from a predetermined path. Stations 140 may also be utilized by Coast Guard or police to track the positions of rescue and search team members. In yet another example, cargo vehicle inspection stations 140, for large carriers 101, such as 18-wheelers, trains, planes, etc., such that if a sensor 106 detects a break in the seal of any boxes, crates, or other small carriers 101 (or changes in weight, carrier 101 positions, etc. Such mobile element-related information 104 could then be transmitted to the cargo vehicle inspection point for cross-referencing with a previous inspection, to determine if the configuration and/or contents of the large carrier 101 have changed since the last inspection. In another example, military devices, such as wristband stations 140, can track the position of soldiers, tanks, missiles, weapons, etc. In yet another example, emergency service providers' communications stations 140, such as police stations, fire departments, hospitals, veterinarians, other law enforcement and medical service providers, etc., so as to instantaneously provide them with mobile element-related information 104. In another example, sprinkler systems, which can put out a fire if a sensor 106 (comprising an information module 103) detects smoke. In yet another example, computer stations 140, such as portable laptops and networks, can provide an index of all mobile elements 102 (and attributes such as destination or weight) under the management of the computer user. In another example, large carriers 101 which are serving small carriers 101, such as a boat (which is a large carrier 101) serves scuba divers (who are small carriers 101 of cameras and other sensors). In yet another example, thermostats, pool water testing devices, cockpits, other conditions regulation-related stations, etc. In another example, checkpoints, such as on an airport luggage conveyor belt, which inventory luggage after a plane arrives. Alternatively, a checkpoint station 140 could be placed in grocery stores, shops, and small businesses, whereby a patron purchasing mobile items 102, for example, candy and a container of soda, would simply walk by the checkpoint. The information 104, such as the price of the gum and soda, would transmit to the checkpoint, which receives the information, totals the price, and presents the "total price" information back to the patron. Alternatively, the patron could allow for automatic debit from a personal account, such as a credit account, which would allow for a transaction to occur in a split second, as the patron walks past the checkpoint out of the store. Alternatively, an indicator, such as a light or voice which says "thank you", comprising the checkpoint could provide the patron and store with an indication that the transaction was properly completed (or not completed at all), so as to prevent patrons from knowingly and unknowingly walking passed the checkpoint with the items and out of the store without paying. Alternatively, the checkpoint could comprise a means for accounting for items carried by the patron, such as a weighing system, which would compare a reference weight, such as the weight of a shopping cart without the items, to a purchasing weight, such as the weight of a shopping cart with the items, to prevent theft where an information module 103 has been removed from one of the items purportedly purchased. The checkpoint could comprise a gateway station 140 (which patrons walk through), a portion of a wall, or may even comprise shopping carts, such that a buyer knows the their "total price" as they shop.

Stations 140 may also be utilized for more advanced tasks. For example, an airport station 140 could be utilized to determine weight distributions on airplanes. If the weight of each piece of cargo or baggage is known (baggage is often weighed upon airport check-in), and airport station 140 collects the weight and positional information for each piece of baggage on a particular airplane, by receiving a transmission from each piece of baggage, the processor 120 comprising the airport station 140 (utilizing customized software which plots points and vectors within the volume of the airplane) can determine if an unreasonable and/or unsafe weight distribution exists on that airplane. In addition, sensors 106 and transmitted positional information can be used to confirm contact with, or the destruction of, a target, where a carrier 101, such as a bullet or missile (mobile element 102 is gun powder, explosives, etc.), comprises a primary information module 103a. A processor 120 could then plot out a grid showing points of impact, targets, soldiers, etc.

Figure 14:
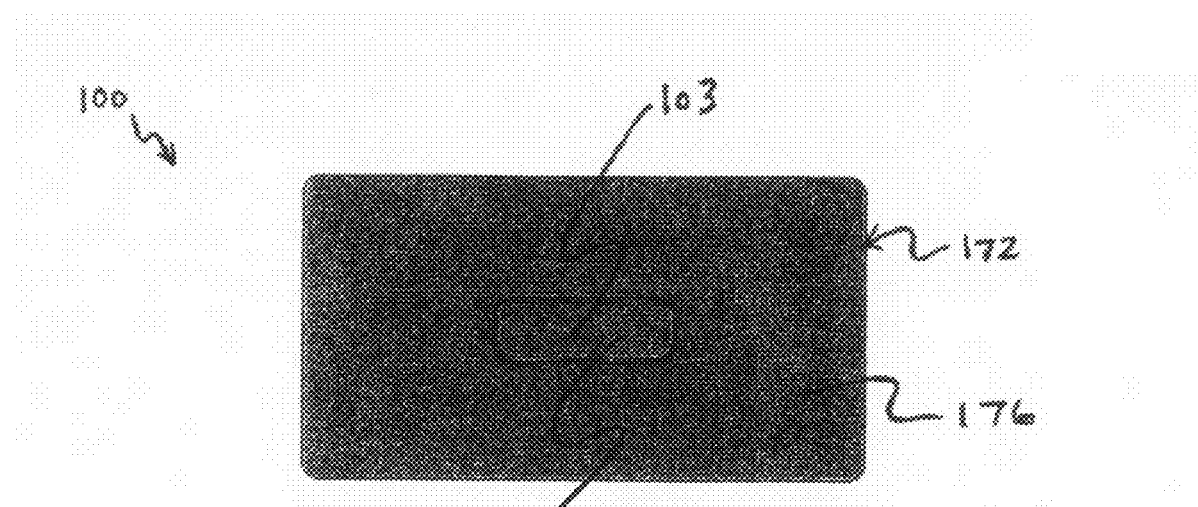
FIG. 14 is a cross-sectional view of a housing.
Figure 15:
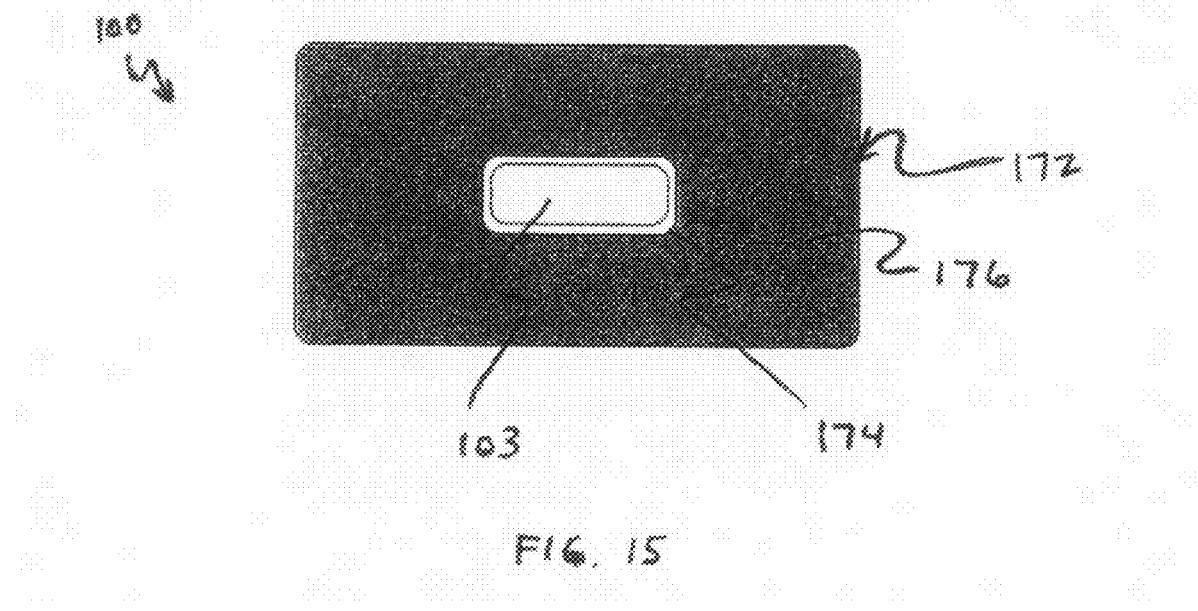
FIG. 15 is a cross-sectional view of a second housing.
Figure 16:
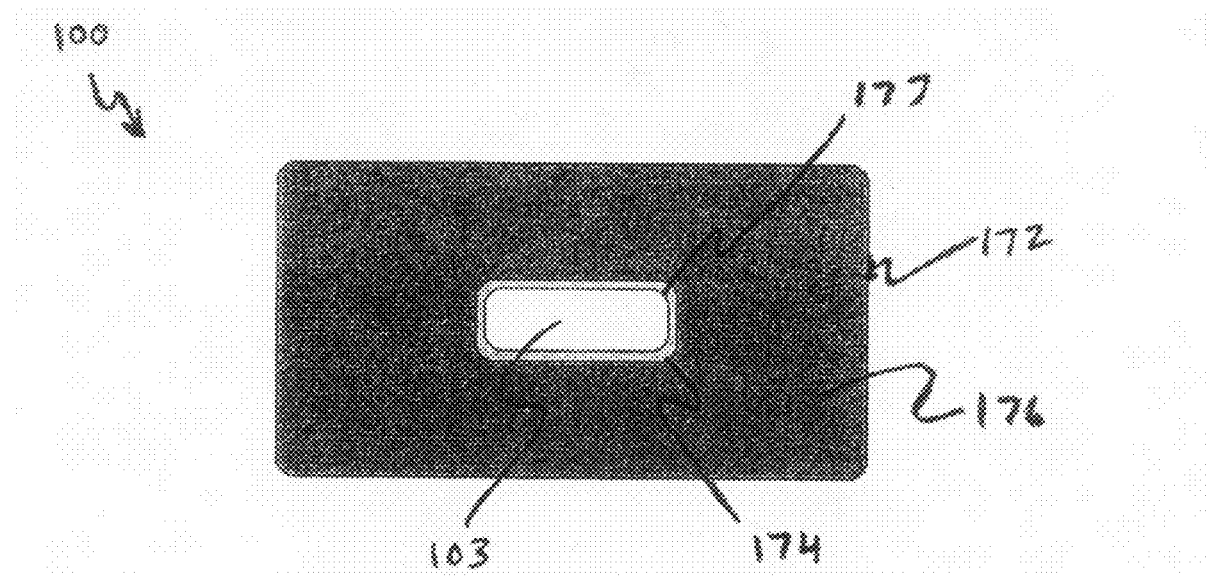
FIG. 16 is a cross-sectional view of a third housing.
Figure 17:
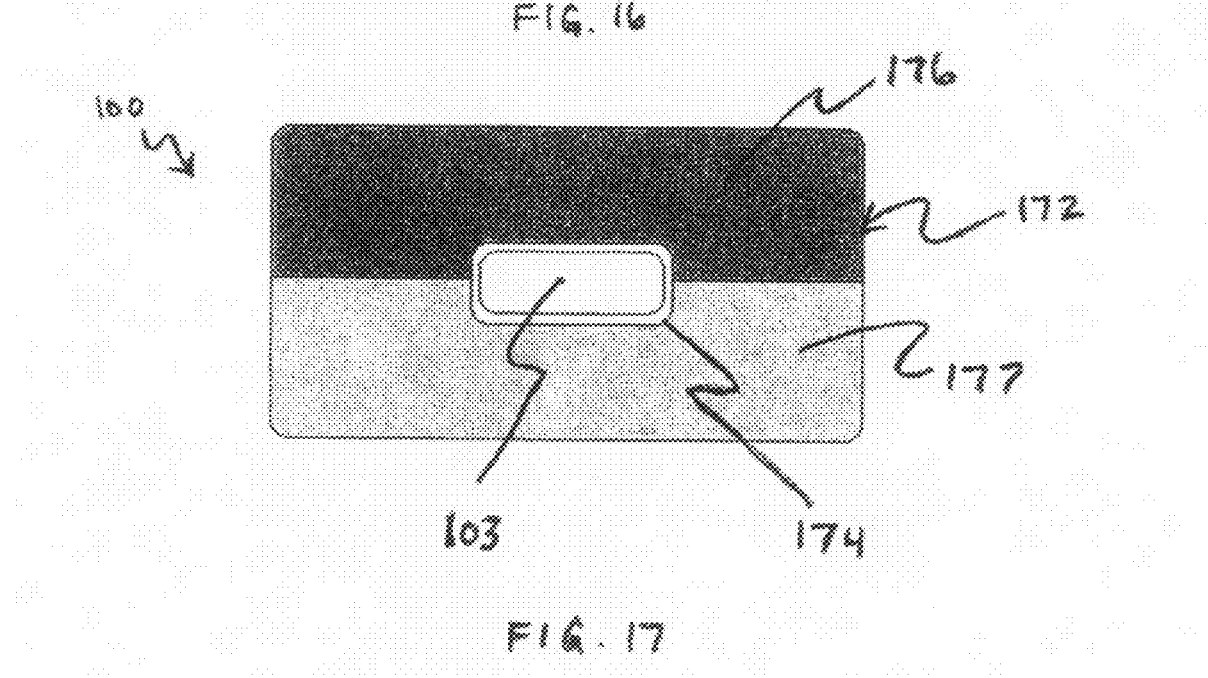
FIG. 17 is a cross-sectional view of fourth housing.

Referring to the cross-sectional FIGS. 14-17, housing 170 preferably comprises a first housing 172, a second housing 174, an information module 103, and a fluid 176, as shown in FIG. 15. Second housing 174 preferably encapsulates at least one information module 103 and fluid 176. First housing 172 preferably encapsulates second housing 174, whereby fluid 176 preferably fills the space exterior to second housing 174 and interior to first housing 172. Surface tension and compressive properties of fluid 176 are utilized to absorb the kinetic energy of information module 103 and second housing 174 (such energy being created whenever housing 170 is involved in a collision). Such a configuration provides protection for the structure of the information module 103, where information module 103 may comprise a mobile element 102 or a carrier 101 which is susceptible to impact. For example, portions of an information module 103, comprising a mobile element 102, such as a bullet, will probably be damaged when the bullet collides with a target. Additional liquids, such as the second fluid 177 shown in FIG. 16, and various housing 170 geometries (although FIGS. 14-17 show the preferred three-dimensionally symmetric housing), may be used to control properties such as dampening coefficients, buoyancy, compression, surface tension, etc. Fluids may also be on the interior of second housing 174, as well as submerging information module 103, as shown in FIG. 14. More than one fluid may also be used, manipulating the various buoyancies of the fluids, as shown in FIG. 17. Conductive fluids may also be utilized to provide electrical transmission.

Remediator 160 is any device which autonomously remedies an undesirable condition and/or predetermined condition, such as the braking device 228 shown in FIG. 6, a device which releases chemicals (such as chlorine) into a pool upon detection of an undesirable predetermined condition (such as a high bacteria count), or some other effectuator. Remediator 160 preferably comprises an information module 103, which allows remediator 160 to receive transmissions from other information modules 103. Remediator 160 may be located anywhere in which a remedy may be introduced to a mobile element-related system. To provide another example, a gun 712, comprising an information module 103a, could also comprise a gun control remediator 160 which autonomously disables the firing ability of gun 712 (when the authorized user is not in transmission range of the gun), such as a locking mechanism 780, preferably micro-size or smaller, preferably located near the trigger (or some other apparatus for preventing the gun from firing). More specifically, an information module 103b comprising a key 781, preferably on the authorized gun user, such as on the authorized gun user's hand 782, could transmit to gun 712, unlocking gun 712 and allowing gun 712 to fire. Such an information module 103b could comprise a ring or wristwatch worn on the shooting hand of an authorized user, which transmits and unlocks gun 712 when the authorized user picks up the gun, as shown in FIG. 21. For example, if a police officer has a government issued gloc, the gloc will not unlock and fire unless a signal from the information module 103b, worn by the police officer, is transmitted to the information module 103a (which would then allow remediator 160 to enable the gun). If the police officer takes off the ring or watch and leaves it at home, he may not be able to fire his gun unless he goes back home and gets the ring or watch. The transmission from information module 103b to 103a would be unique, such as at a particular frequency, so that each gun has its own unique unlocking transmission. If a child picks up the police officer's gun, the gun will remained locked. If a criminal picks up the police officer's gun, the gun will remain locked (unless, of course, the child or criminal acquires or takes the information module 103b from the police officer).

System 100 may also comprise software 161 to be used with a controller 162, which is utilized to process and manage mobile element-related information 104. Controller 162 preferably comprises a personal digital assistant (PDA), hand held processor, portable computer, and/or any other processor 120.

BEST MODE

Figure 7:
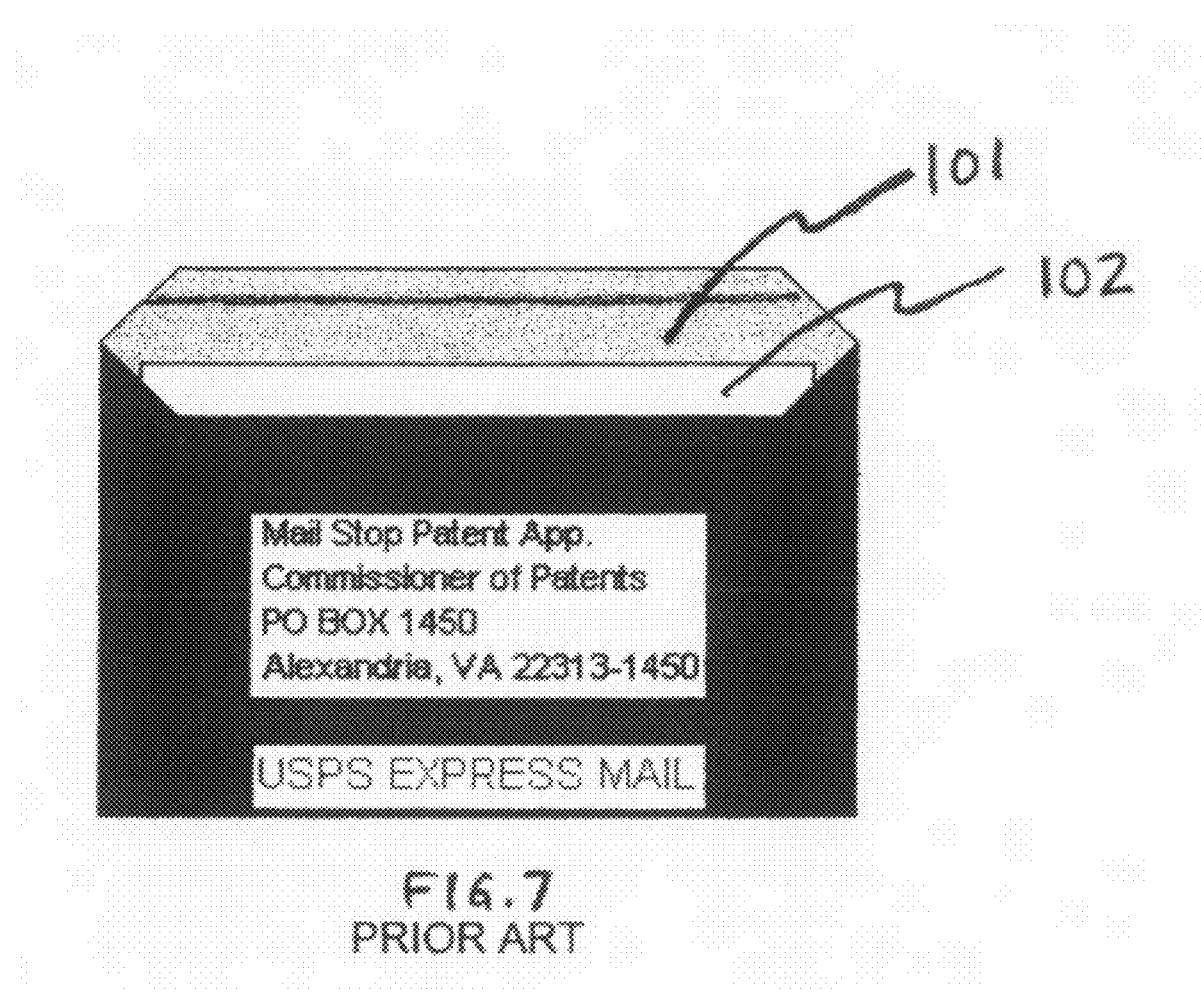
FIG. 7 is a perspective view of a prior art express mail envelope.

As shown in FIGS. 7-13, the best mode of the present invention provides for a mobile element 102, such as a non-provisional patent application 410, to be mailed in a carrier 101, such as a blue cardboard express mail envelope or some other postal container 412, comprising at least one information module 103, as shown in FIG. 8, preferably integrated with postal container 412 during the manufacturing of postal container 412. FIG. 7 demonstrates a prior art express mail envelope. Each information module 103 comprises at least one communication element 105 and at least one information operations element 119. Each communication element 105 preferably comprises a transmitter 108, a receiver 112, and at least one sensor 106. Each information operations element 119 comprises at least one processor and at least one data storage element 122. In addition, six stations 140 are preferably utilized.

Figure 9:
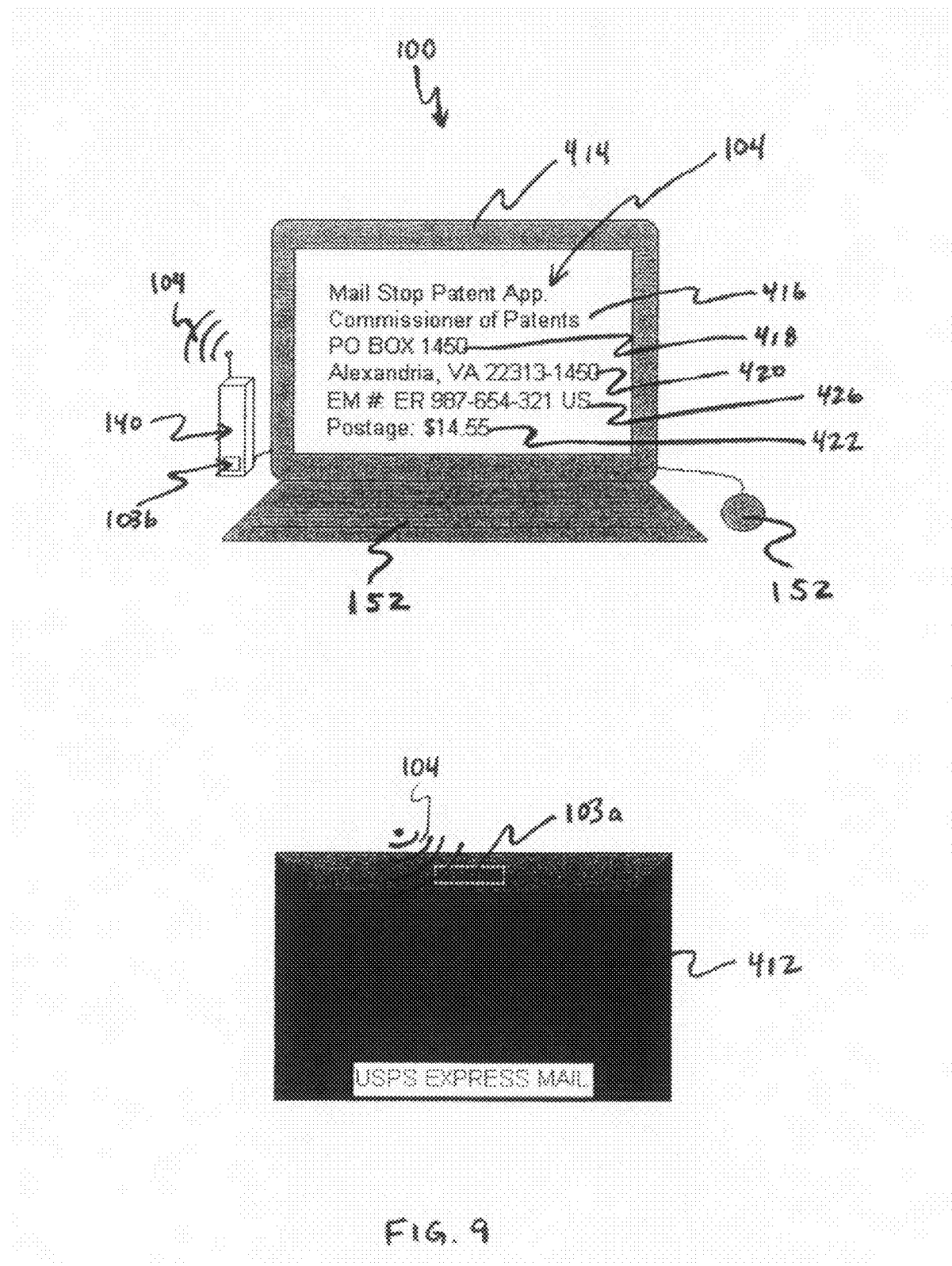
FIG. 9 is a first station according to the best mode of the present invention.

A mail sender 402 would utilize a first station 140, such as a home computer 414, as shown in FIG. 9, to transmit mobile element-related information 104, such as the name 416, street address 418, zip code 420 of a mail recipient 404, digital postal credits 422 (cost of shipping deducted from a credit account mail sender 402 has with the USPS), recipient information 424, and express mailing number 426, to the receiver 112 comprising postal container 412. Information 416, 418, 420, 422, 424, and 426 would then be stored in the data storage element 122 comprising postal container 412. Mail sender 402 would then place patent application 410 into postal container 412, and seal shut the postal container 412. Mail sender 402 would then deliver express mail box 112 to a first USPS employee 406.

Figure 10:
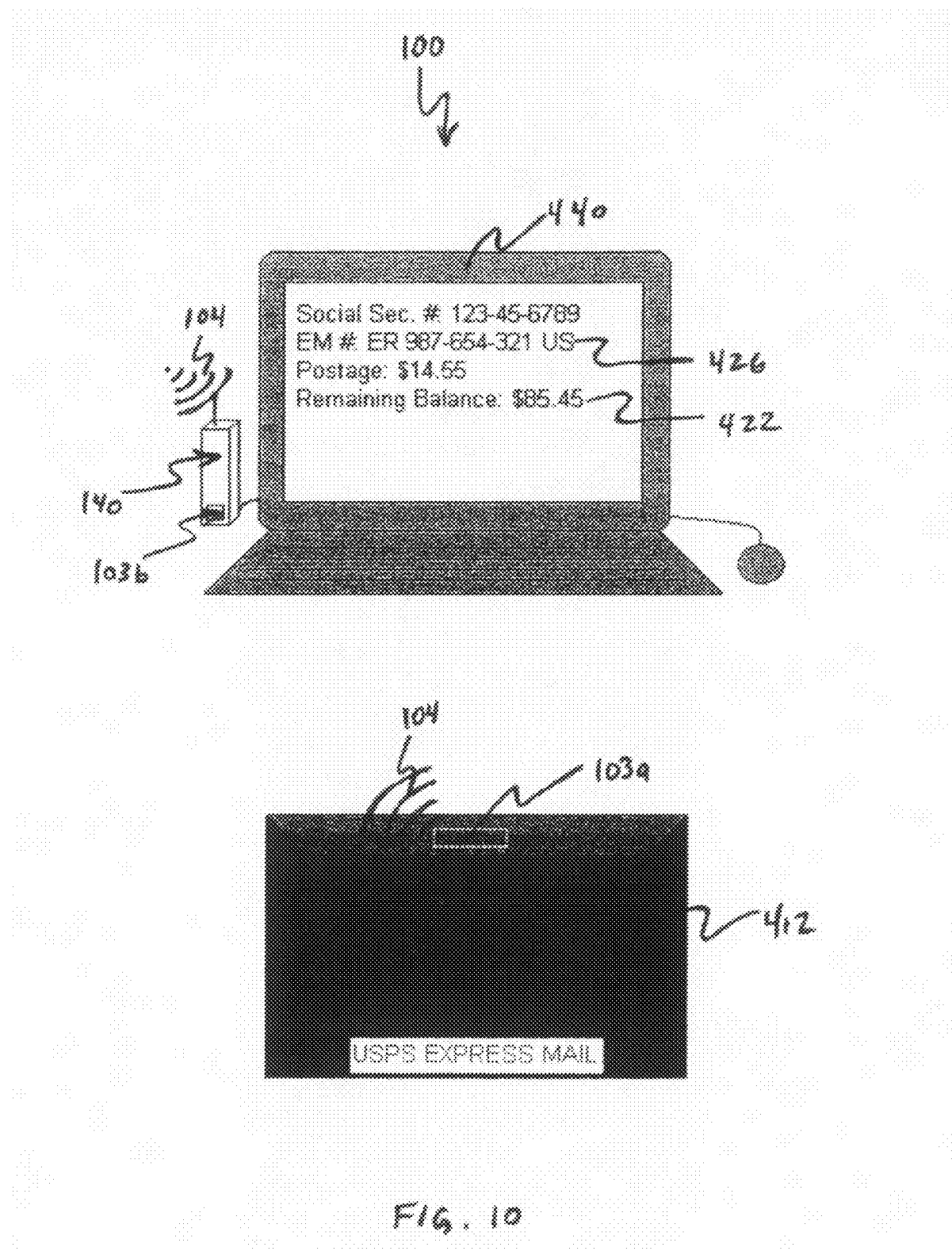
FIG. 10 is a second station according to the best mode of the present invention.

First USPS employee 406 would then deliver postal container 412 to a second station 140, such as a USPS mail sorter 440, as shown in FIG. 10. Information 104 would be autonomously transmitted from postal container 412 to USPS mail sorter 440, whereby USPS mail sorter 440, autonomously sorts and/or forwards postal container 412 to a transporter (specific to the destination information of zip code 420), such as an airplane 444, as shown in FIG. 11. Airplane 444 may serve as both a carrier 101, and a third station 140, as shown in FIG. 11, compiling the mobile element-related information 104 (of all mobile elements 102 carried by airplane 444), in a data storage element 122 comprising airplane 444. A fourth station 140, comprising a USPS ground station 446, as shown in FIG. 11, could track the entire USPS plurality of transporters, utilizing mobile element-related information 104 transmitted from transporters such as airplane 444, other airplanes, trains, and trucks. In addition, a station 140 may comprise software 900 that provides the USPS with detailed position tracking of all USPS transporters comprising information modules 103, as well as all of the USPS postal containers comprising information modules 103. The software 900 may also comprise processes for organizing mobile element-related information 104 such as the position of several packages headed to the same zip code, as well as weight distributions across an airplane (for such purposes as balancing the weight of the plane for a safer and stabilized flight). All of the postal containers (comprising information modules 103) on airplane 444 could then be autonomously sorted utilizing street address information 418. A sensor 106 on a postal container could be utilized to detect the presence of hazards, such as anthrax or other bacteria or viruses, located on other parcels moving through the USPS, as well as to detect if a postal container has been opened.

Figure 12:
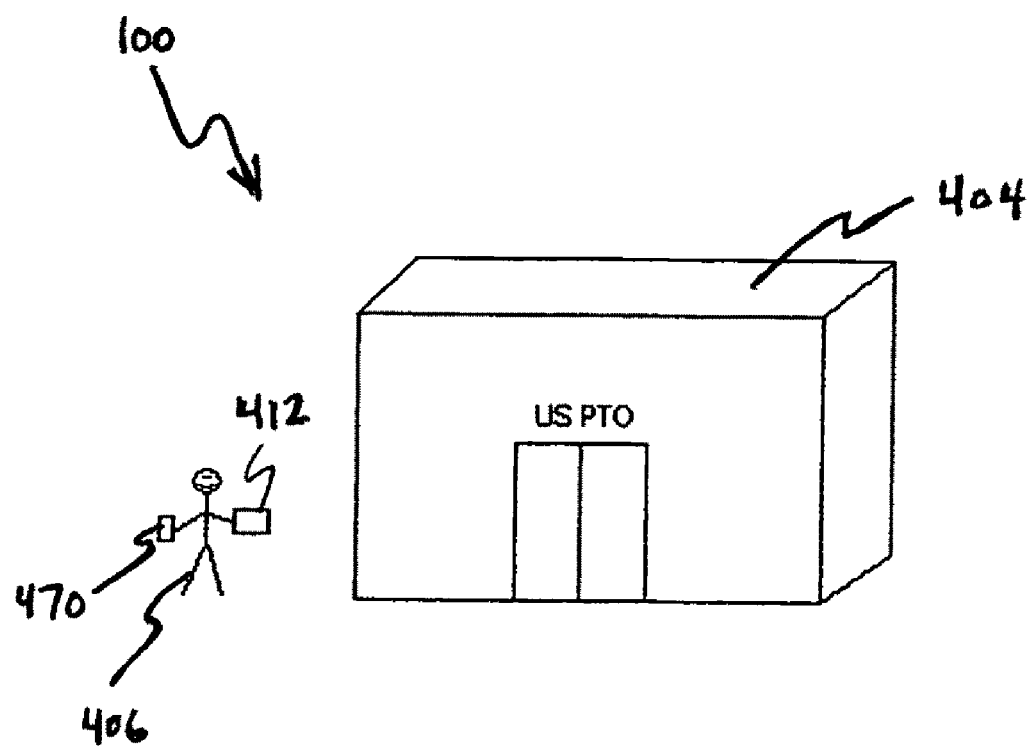
FIG. 12 is a fifth station according to the best mode of the present invention.

A second USPS employee 406, located at the destination of postal container 412, could then deliver postal container 412 to mail recipient 404, utilizing name information 416 transmitted from postal container 412 to a fifth station 140, such as a hand held device 470 utilized by second USPS employee 406, as shown in FIG. 12.

Figure 13:
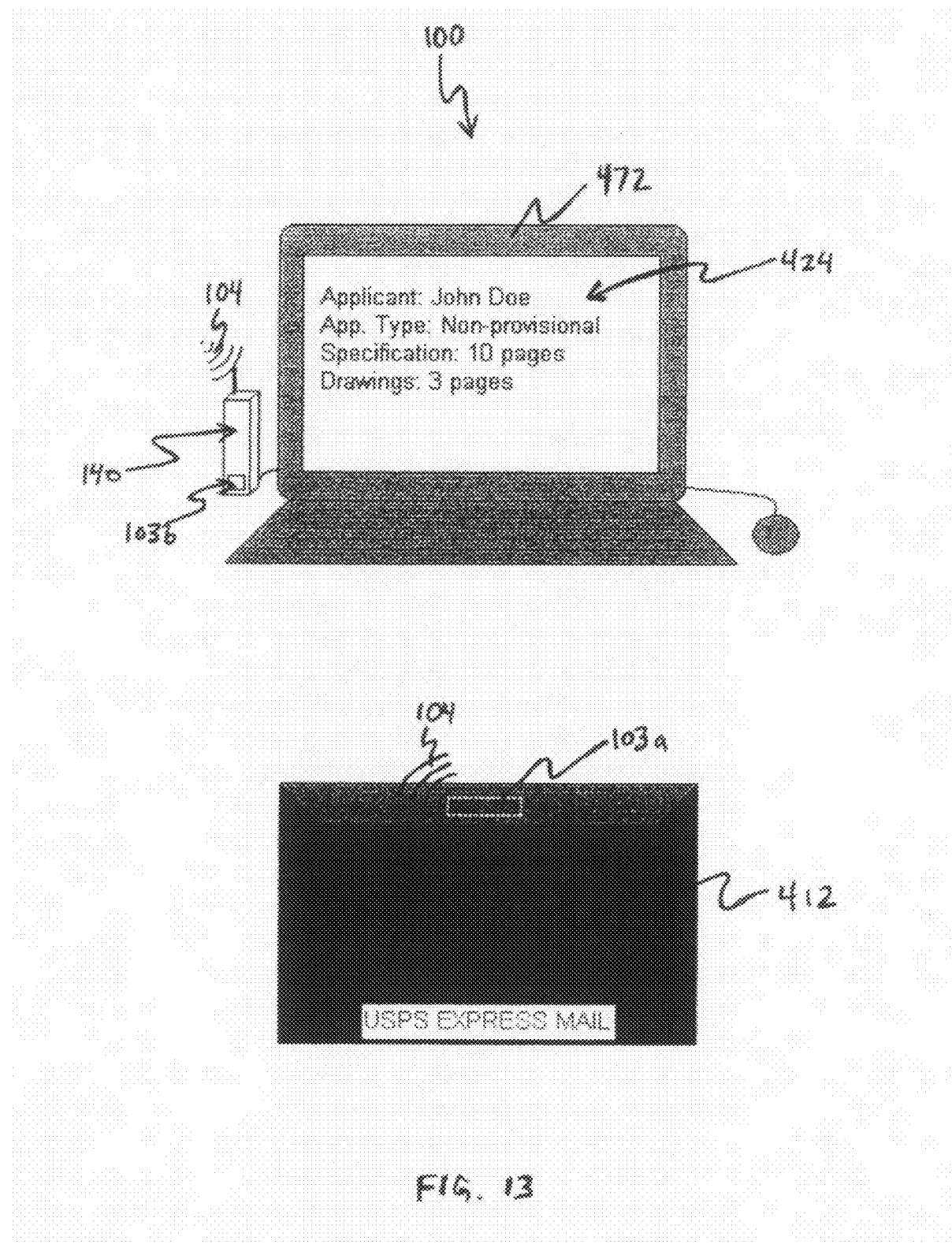
FIG. 13 is a sixth station according to the best mode of the present invention.

Mail recipient 404, in this case the PTO, as shown in FIG. 13, could then use recipient information 424, transmitted from postal container 412 to a sixth station 140, such as a PTO receiving station 472. In this embodiment, information 424 comprises patent application information such applicant name, application type (such as non-provisional), charge account number, and/or other information necessary to processing mail received by the PTO. PTO receiving station 472, comprising the PTO database, would then upload applicant's information for PTO processing, without ever manually typing any information into a PTO computer. Sender 402 could then be contacted, such as by text messaging or email, indicating that postal container 412 has been opened (if cross-referenced with positional information, sender 402 can confirm that the postal container 412 was opened at the PTO building).

Alternatively, mail sender 402 could have transmitted the above information 104, to another type of carrier 101, such as an express mailing label 490. For example, a label one centimeter by one centimeter in size, less than a millimeter thick, and adhesively attachable to an envelope. Express mailing label 490 may also comprise a USPS hologram 492, so as to indicate that the label is USPS authentic and that it is a mailing label and not some other label. Sender 402 may also be contacted when a sensor 106 detects that label 490 is separated from patent application 410.

Alternatively, postal container 412 could have additionally been manufactured with a housing 170 that encapsulates information module 103, and contains a fluid 176. The fluid 176 would protect information module 103 from damage, where, for example, postal container 412 is dropped on the ground and the impact of the ground would have otherwise damaged information module 103.

Similarly, system 100 could be applied to DVD's 720, CD's, other merchandise, and/or other sellables 196, such that a person at a store would not have to scan each separate piece of merchandise. For example, a shopper could walk a grocery cart through or passed large stations 140, such as checkpoints, which account for each sellable or piece of merchandise simultaneously, rather than by scanning each item, allowing for a rapid checkout. The transmissions from each information module 103 on each item would be picked up simultaneously, providing the buyer with an instant "total price". Alternatively, sellables could be checked out individually as they are taken by the shopper, and unchecked out if placed back on the shelf. Software 900 could track, at anytime, which sellables and merchandise are being carried at any given moment by any given shopper. An additional information module 103, for example, comprising a credit card or means for payment, could be debited by the checkpoint immediately following a determination of the total price. As a result, grocery shoppers could fill their grocery carts (or other some other grocery carrier) with numerous sellables, then proceed past a checkpoint, which completes the sales transaction in a matter of seconds, without the grocery shoppers ever breaking stride. Furthermore, grocery shoppers could then fill grocery bags as they shop, rather than after checking out at a register. Depending on the transmission range of the checkpoint, the shopper may not have to "pass" the checkpoint at all, as each item is checked out as it is taken off a shelf. Also as a result, a grocery cart (or some other grocery carrier) could now comprise a means for packaging or "bagging" groceries or other merchandise. Security personnel and supply personnel at a store could track every piece of merchandise in the store's possession (including trucks, warehouses, and stores), on a computer monitor, using positional tracking software 900.

Similarly, system 100 could be applied to luggage. For example, an airline could ensure that all luggage on a particular flight is actually on the correct airplane, as a station 140 proximate to the airplane would "scan" all of the luggage simultaneously. A piece of luggage, which was accidentally loaded onto the wrong airplane, could then be removed.

Similarly, system 100 could be applied to weapons. Military entities could account for the location of all weapons 190 and all bullets 710 at all times (the final embedded location in the case of a bullet), as shown in FIG. 21. Utilizing software 900, the military and law enforcement agencies would be able track trajectories and create timelines for attacks and shootings by analyzing weapon positions upon firing and comparing them to the final destination of the corresponding bullet or other weapons projectile.

Similarly, system 100 could be applied to identification (I.D.). A customer 742 carrying a document 740, such as an I.D. or driver's license, while entering a bar, could be "checked" for age, by a checkpoint station 140, to ensure they are at least 21 years old. A photo 743 and other information related to the customer 742, transmitted from the information module 103 comprising document 740, could appear on a station 140 proximate to a bar employee 741 who could compare the photo 743 and information to the customer 742, as shown in FIG. 20. Patrons at a stadium event could be "checked" for identification and scanned for an admission "ticket", by a checkpoint station 140, allowing dozens of patrons to enter simultaneously, rather than having stadium employees tediously check individual tickets. Furthermore, such a configuration could be networked to DMV and law enforcement databases, alerting law enforcement to the presence of a person (with an outstanding arrest warrant, etc.) at a particular bar (or other location with such a checkpoint configuration).

Analogous to the use of an envelope with mail, a person could quickly integrate system 100 with a mobile item utilizing carriers 101, such as clips, labels, staples, stickers, etc., comprising information modules 103, as shown in FIG. 18. Such carriers 101 would allow people working together in an office to forego writing out "to", "from", "regarding", and similar information, when transporting items, such as documents, to each other. A "scanning" station 140 (preferably comprising the person's computer) located on each person's desk could scan for such information and cause the information to appear on the recipient's computer screen, a handheld device, or some other display station 140 (recipient does not have to be in the office). For example, "inbox: paperwork; from John Doe; needs your signature" would appear on the recipients computer screen, so as to eliminate the necessity of the recipient to shuffle through the paper work and figure out why a document was sent to him or her. Such mobile element-related information 104 could be "attached" to the clip, sticker, or label by the sender utilizing a station 140 and/or voice recognition software or pre-programmed clips (such clips being used for repeated tasks, such as acquiring the signature of the recipient). A recipient could listen to a detailed "text attachment" or "audio attachment" provided by the sender which instructs the recipient what to do with a document (or any other physical item received).

Figure 5B:
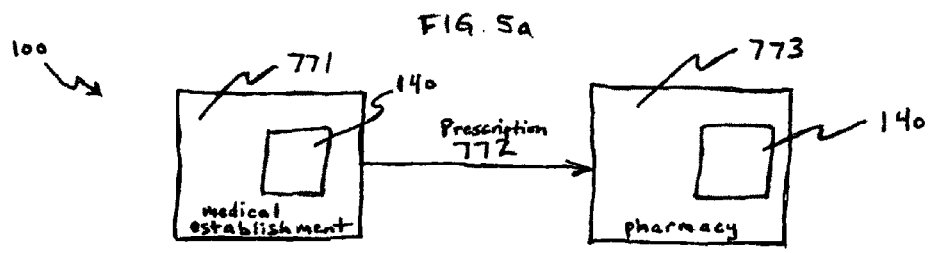
FIG. 5b is a doctor's station according to an alternative embodiment of the present invention.

Similarly, as shown in FIG. 5*b*, medical establishments 771 could use an input 151 to order prescriptions 772 utilizing an information module 103 comprising medical establishment 771, such as a handheld device, which immediately transmits to a station 140 comprising a pharmacy 773. Preferably, the prescription is ready before the prescribee arrives at the pharmacy 773.

Figure 5C:
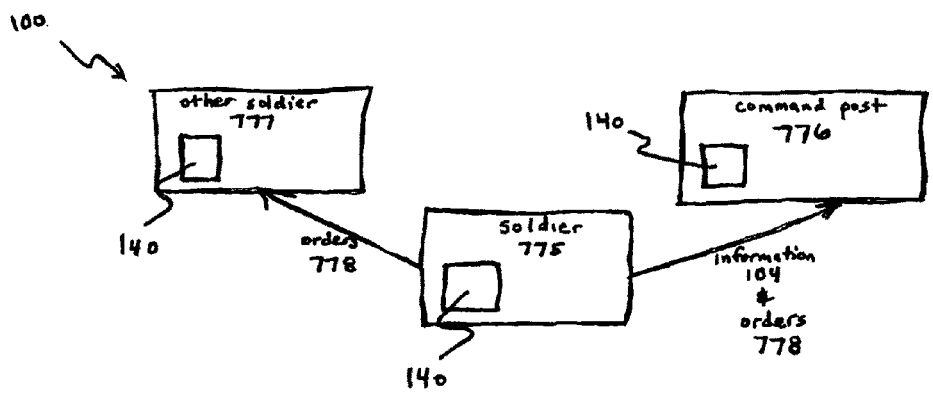
FIG. 5c is a soldier's station according to an alternative embodiment of the present invention.

Similarly, as shown in FIG. 5*c*, individual soldiers 775 on a battlefield, without speaking, could use an input 151 comprising an information module 103 and a carrier 101, such as a wristband, to relay information 104 to a command post station 776 or other stations 140 used by other soldiers 777, preferably a command post station 140 capable of executing orders 778, such as a orders to provide air support, launch missiles at a specific GPS position, etc.

Similarly, a wireless earpiece 702 worn by people who want to handle phone calls while still having both hands free and no wires or actual phone devices getting in their way, as shown in FIG. 18. The single wireless earpiece could receive calls from phone devices such as the cell phone 701 of cell phone user 711, home phone, computer phone, and/or work phone. The actual phone device would not have to be held up to the person's ear with one hand, nor would a wire from the phone device to a non-wireless earpiece interfere with the person's hand and arm movement, or limit the person's range of movement. A wireless receiver could also be attached to the earpiece 702, clothing 706, or some other portion of the person, such that the person would not have to speak into the receiver comprising an actual phone device (such a phone device could be voice activated or only touched by the person when answering or hanging up on a caller). Similarly, an information module 103 could be integrated into the audio or speaker system of a vehicle allowing for hands free reception of calls from the person's cell phone, home phone, computer phone, and/or work phone. A receiver 704 could be placed on the steering wheel 703 or anywhere else on the interior of the vehicle such that the person would not have to speak into the receiver comprising the actual phone device receiving the call. In addition, system 100 provides for manual and automatic uploading of data stored on cell phone 701, so as to provide for a backup of data, such as stored phone numbers, where cell phone 701 is damaged, lost, or stolen, as well as an information module 103 comprising cell phone 701 capable of receiving television transmissions to be output on cell phone 701.

In the embodiments described above, the words "a," "an," and "one" are not intended to mean "only one" but can also mean any number greater than one. Similarly, plural terms are sometimes used for convenience and are not necessarily intended to mean "more than one" but can also mean just "one." In addition, within the embodiments described above, the modifier "and/or" has been utilized to indicate that either modifier may be used in that surrounding group. For example, "X and/or Y" represents "X and Y", as well as "X or Y".

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the spirit and scope of the appended claims. The single independent claim below is identical to issued claim 19 of application Ser. No. 11/021,176 and both claims share the same inventor.

What is claimed is:

1. A discreet information system, used to provide mobile element-related information involving at least one mobile element, comprising, in combination:
   a plurality of information modules located proximate to the at least one mobile element;
   wherein said plurality of information modules comprise at least one communications element;
   wherein said at least one communications element comprises at least one transmitter;

wherein at least one of said plurality of information modules is embedded in at least one carrier;
wherein the at least one carrier comprises at least one bullet;
wherein at least one of said plurality of information modules comprise at least one station;
wherein said at least one station comprises at least one information operations element;
wherein said at least one information operations element comprises at least one data processor; and
wherein said at least one communications element comprises at least one receiver.

2. A discreet information system, used to provide mobile element-related information involving at least one mobile element, comprising, in combination:
a plurality of information modules located proximate to the at least one mobile element;
wherein said plurality of information modules comprise at least one communications element;
wherein said at least one communications element comprises at least one transmitter;
wherein at least one of said plurality of information modules is embedded in at least one carrier;
wherein at least one carrier comprises at least one document;
wherein at least one of said plurality of information modules comprise at least one station;
wherein said at least one station comprises at least one information operations element;
wherein said at least one information operations element comprises at least one data processor; and
wherein said at least one communications element comprises at least one receiver.

3. A discreet information system, used to provide mobile element-related information involving at least one mobile element, comprising, in combination:
a plurality of information modules located proximate to the at least one mobile element;
wherein said plurality of information modules comprise at least one communications element;
wherein said at least one communications element comprises at least one transmitter;
wherein at least one of said plurality of information modules is embedded in at least one carrier;
wherein the at least one carrier comprises at least one soldier;
wherein at least one of said plurality of information modules comprise at least one station;
wherein said at least one station comprises at least one information operations element;
wherein said at least one information operations element comprises at least one data processor; and
wherein said at least one communications element comprises at least one receiver.

4. A discreet information system, used to provide mobile element-related information involving at least one mobile element, comprising, in combination:
a plurality of information modules located proximate to the at least one mobile element;
wherein said plurality of information modules comprise at least one communications element;
wherein said at least one communications element comprises at least one transmitter;
wherein at least one of said plurality of information modules is embedded in at least one carrier;
wherein the at least one carrier comprises at least one postal container;

wherein at least one of said plurality of information modules comprise at least one station;
wherein said at least one station comprises at least one information operations element;
wherein said at least one information operations element comprises at least one data processor; and
wherein said at least one communications element comprises at least one receiver.

5. A discreet information system, used to provide mobile element-related information involving at least one mobile element, comprising, in combination:
a plurality of information modules located proximate to the at least one mobile element;
wherein said plurality of information modules comprise at least one communications element;
wherein said at least one communications element comprises at least one transmitter;
wherein at least one of said plurality of information modules is embedded in at least one carrier;
wherein the at least one carrier comprises at least one luggage;
wherein at least one of said plurality of information modules comprise at least one station;
wherein said at least one station comprises at least one information operations element;
wherein said at least one information operations element comprises at least one data processor; and
wherein said at least one communications element comprises at least one receiver.

6. A discreet information system, used to provide mobile element-related information involving at least one mobile element, comprising, in combination:
a plurality of information modules located proximate to the at least one mobile element;
wherein said plurality of information modules comprise at least one communications element;
wherein said at least one communications element comprises at least one transmitter;
wherein at least one of said plurality of information modules is embedded in at least one carrier;
wherein the at least one carrier comprises at least one ticket;
wherein at least one of said plurality of information modules comprise at least one station;
wherein said at least one station comprises at least one information operations element;
wherein said at least one information operations element comprises at least one data processor; and
wherein said at least one communications element comprises at least one receiver.

7. A discreet information system, used to provide mobile element-related information involving at least one mobile element, comprising, in combination:
a plurality of information modules located proximate to the at least one mobile element;
wherein said plurality of information modules comprise at least one communications element;
wherein said at least one communications element comprises at least one transmitter;
wherein at least one of said plurality of information modules is embedded in at least one carrier;
wherein the at least one carrier comprises at least one merchandise;
wherein at least one of said plurality of information modules comprise at least one station;
wherein said at least one station comprises at least one information operations element;

wherein said at least one information operations element comprises at least one data processor, and wherein said at least one communications element comprises at least one receiver.

8. A discreet information system, used to provide mobile element-related information involving at least one mobile element, comprising, in combination:

a plurality of information modules located proximate to the at least one mobile element;

wherein said plurality of information modules comprise at least one communications element;

wherein said at least one communications element comprises at least one transmitter;

wherein said at least one communications element comprises at least one sensor;

wherein at least one of said plurality of information modules is embedded in at least one carrier;

wherein at least one of said plurality of information modules comprise at least one station;

wherein said at least one station comprises at least one information operations element;

wherein said at least one information operations element comprises at least one data processor; and wherein said at least one communications element comprises at least one receiver.

\* \* \* \* \*